(12) United States Patent
Rowley et al.

(10) Patent No.: US 7,974,760 B2
(45) Date of Patent: *Jul. 5, 2011

(54) ADVANCED POWER-SHIFT TRANSMISSION CONTROL SYSTEM

(75) Inventors: John Rowley, Tigard, OR (US); Hong-Chin Lin, Glenview, IL (US); Chenyao Chen, Portland, OR (US); Robert Lee Chess, Troutdale, OR (US)

(73) Assignee: NMHG Oregon, Inc., Portland, OR (US)

( * ) Notice: Subject to any disclaimer, the term of this patent is extended or adjusted under 35 U.S.C. 154(b) by 977 days.

This patent is subject to a terminal disclaimer.

(21) Appl. No.: 11/516,913

(22) Filed: Sep. 6, 2006

(65) Prior Publication Data

US 2007/0010927 A1 Jan. 11, 2007

Related U.S. Application Data

(63) Continuation-in-part of application No. 10/689,812, filed on Oct. 20, 2003, now Pat. No. 6,950,737.

(60) Provisional application No. 60/580,988, filed on Jun. 18, 2004.

(51) Int. Cl.
    *G06G 7/76* (2006.01)
(52) U.S. Cl. ............... 701/70; 701/67; 701/54; 701/95; 701/51
(58) Field of Classification Search ............ 701/67, 701/70, 78, 93, 95, 121, 51–54; 303/113.2, 303/138; 180/197
    See application file for complete search history.

(56) References Cited

U.S. PATENT DOCUMENTS

| | | | |
|---|---|---|---|
| 3,442,152 A | 5/1969 | Chana | |
| 3,893,552 A | 7/1975 | Dahl | |
| 4,129,148 A | 12/1978 | Lech | |
| 4,144,863 A | 3/1979 | Abdoo | |
| 4,838,622 A | 6/1989 | Kircher et al. | |
| 5,048,655 A | 9/1991 | Seeba | |
| 5,568,378 A | 10/1996 | Wojsznis | |
| 5,833,210 A | 11/1998 | Sommer | |
| 5,901,059 A | 5/1999 | Tao et al. | |
| 5,918,509 A | 7/1999 | Heilig et al. | |
| 6,186,029 B1 | 2/2001 | McQuinn | |
| 6,335,609 B1 | 1/2002 | Amey et al. | |
| 6,684,148 B2 | 1/2004 | Chess | |
| 6,901,324 B2 | 5/2005 | Rose et al. | |
| 7,006,909 B1 | 2/2006 | May | |
| 7,146,263 B2 | 12/2006 | Guven et al. | |
| 2002/0107111 A1 | 8/2002 | Murakami | |
| 2003/0209047 A1 | 11/2003 | Nelepovita | |

(Continued)

FOREIGN PATENT DOCUMENTS

DE       3135055       4/1983

(Continued)

OTHER PUBLICATIONS

Cooksley, "Stepless Changes", IVT Int'l, Issue Feb. 2001, 3 pgs.

(Continued)

*Primary Examiner* — Richard M. Camby
(74) *Attorney, Agent, or Firm* — Stolowitz Ford Cowger LLP

(57) ABSTRACT

A method for controlling a power-shift transmission comprising controlling a vehicle travel speed by simultaneously slipping two or more clutch packs associated with opposing directions of vehicle travel and adjusting an engine speed, according to a programmed response associated with a change in one or more of the engine speed, a torque converter slip, a selected direction of vehicle travel, and an accelerator position.

35 Claims, 11 Drawing Sheets

| No. | Vehicle Speed (TOSS) | IBPP | APP | Sub-State |
|---|---|---|---|---|
| 1 | Low | Low | Low | Roll Reduction |
| 2 | " | " | High | Normal |
| 3 | " | High | Low | Roll Reduction |
| 4 | " | " | High | Inching |
| 5 | High & Opposite Direction | Low | Low | Power Reversal |
| 6 | " | " | High | Power Reversal |
| 7 | " | High | Low | Power Reversal |
| 8 | " | " | High | Power Reversal |
| 9 | High & Same Direction | Low | Low | Pack Braking |
| 10 | " | " | High | Normal |
| 11 | " | High | Low | Pack Braking |
| 12 | " | " | High | Inching |

U.S. PATENT DOCUMENTS

| | | |
|---|---|---|
| 2005/0245351 A1 | 11/2005 | Yamada et al. |
| 2006/0293822 A1 | 12/2006 | Lattemann et al. |
| 2007/0010927 A1 | 1/2007 | Rowley et al. |
| 2007/0179017 A1 | 8/2007 | Yamada et al. |

FOREIGN PATENT DOCUMENTS

| | | |
|---|---|---|
| EP | 0299235 | 1/1989 |
| EP | 1031487 | 8/2000 |
| EP | 1093986 | 10/2000 |
| GB | 663704 | 12/1951 |
| GB | 717868 | 11/1954 |
| GB | 730576 | 5/1955 |
| GB | 803667 | 10/1958 |
| GB | 807395 | 1/1959 |
| GB | 863815 | 3/1961 |
| GB | 931262 | 7/1963 |
| GB | 974481 | 11/1964 |
| GB | 1010876 | 11/1965 |
| GB | 1017626 | 1/1966 |
| GB | 1028889 | 5/1966 |
| GB | 1050283 | 12/1966 |
| GB | 1236040 | 6/1971 |
| GB | 1331352 | 9/1973 |
| GB | 1337712 | 11/1973 |
| GB | 1520100 | 4/1977 |
| GB | 2262818 | 6/1993 |
| JP | 4869951 | 12/1971 |
| JP | 1240350 | 9/1989 |
| JP | 3007625 | 1/1991 |
| JP | 03292456 | 12/1991 |
| JP | 4134141 | 5/1992 |
| JP | 4140567 | 5/1992 |
| JP | 4325733 | 11/1992 |
| JP | 06247190 | 6/1994 |
| JP | 2001116070 | 4/2001 |
| JP | 2002235846 | 8/2002 |
| JP | 2002363038 | 12/2002 |
| JP | 2002367299 | 12/2002 |
| JP | 2003182408 | 7/2003 |
| WO | 2005021315 | 3/2005 |

OTHER PUBLICATIONS

Dicks, "Drive through hydrostatics", IVT '99—Lift Truck & Materials Handling, pp. 65-68.
Failing, Braking in the Wet, IVT Int'l, 2002, pp. 117-118.
Meinke et al., "Breaking News", IVT Int'l, 2002, 4 pgs.
Scheffels, "Transmission: auto, manual or both", IVT Int'l, Issue Feb. 2000, 3 pgs.
Scheffels, "Hydraulics—the advantages of electronics", IVT Europe, Mar. 1998, 5 pgs.
Scheffels, "Electronics on the advance", IVT Europe, Issue 3, Jul. 1998, 5 pgs.
Taylor et al., "Electronic hydrostatics—the future of transmissions", IVT—Materials Handling, Jan. 1998, 3 pgs.
European Patent Office, European Search Report for EP08167535; Aug. 2, 2010.

| No. | Vehicle Speed (TOSS) | IBPP | APP | Sub-State |
|---|---|---|---|---|
| 1 | Low | Low | Low | Roll Reduction |
| 2 | " | " | High | Normal |
| 3 | " | High | Low | Roll Reduction |
| 4 | " | " | High | Inching |
| 5 | High & Opposite Direction | Low | Low | Power Reversal |
| 6 | " | " | High | Power Reversal |
| 7 | " | High | Low | Power Reversal |
| 8 | " | " | High | Power Reversal |
| 9 | High & Same Direction | Low | Low | Pack Braking |
| 10 | " | " | High | Normal |
| 11 | " | High | Low | Pack Braking |
| 12 | " | " | High | Inching |

ADVANCED POWER-SHIFT TRANSMISSION CONTROL SYSTEM

This patent application claims priority from PCT Application No. US2005/021956 filed Jun. 20, 2005, entitled Advanced Power-Shift Transmission Control System, and U.S. Provisional Application No. 60/580,988, filed Jun. 18, 2004, entitled Transmission Control System, and further claims priority from and is a continuation-in-part of U.S. patent application Ser. No. 10/689,812, filed Oct. 20, 2003, now U.S. Pat. No. 6,950,737, entitled Transmission Control System.

BACKGROUND

Electronic control of transmission systems for industrial vehicles is a well established method of controlling acceleration and deceleration. In conventional applications, a transmission controller is often used to automatically engage or shift transmission clutch packs when the vehicle travel speed reaches a certain threshold, for example. Similarly, the transmission controller may initiate a form of clutch pack braking to assist in decelerating the vehicle. For industrial vehicles such as lift trucks, in particular, great demands are placed on the transmission system by the operator under normal materials transport applications. For example, the lift truck operator is required to change directions frequently, vary speeds from fine incremental adjustments at low speeds to relatively high speeds, lift and transport heavy loads, and all the while controlling a myriad of hydraulic functions which are dependent on engine speed for supplying hydraulic pressure and flow.

Control of the transmission and engine speed has conventionally been managed in part by a transmission controller, an engine controller, and the operator in order to provide the operator with maximum flexibility and control of the lift truck operation. As such, conventional lift trucks include an accelerator pedal, an inching/brake pedal, and a separate brake pedal, which allow for the simultaneous control of both engine speed and vehicle travel speed, thereby providing for independent control of the hydraulic functions and vehicle travel speed. This is especially important when traveling at low vehicle travel speeds, or when operating the lift truck on an incline, for example. At low vehicle travel speeds, the engine speed is typically operating at a reduced rpm, and significant hydraulic function demands can result in engine drag that will ultimately cause the engine to stall if the engine speed is not increased accordingly. Similarly, operation of a lift truck on an incline poses the additional difficulty that the lift truck will tend to accelerate down the incline due to gravity which contradicts the operator demand for incremental fine adjustment at a low speed in order to position or handle a load.

Conventional transmission systems require considerable skill and training by the operator to use multiple foot pedals while at the same time operating three or more hand levers or controls, in order to simultaneously control engine speed, vehicle acceleration and braking, and hydraulic function. In addition, as brake shoes and other components wear during normal operation, regularly schedule maintenance of the braking, inching, and hydraulic function interaction are administered to ensure proper lift truck operation. The demands placed on the transmission from these types of applications often result in high energy absorption requirements in the transmission and engine, and when the energy absorbed exceeds the ability of the cooling system, the transmission and engine systems will run hot and lead to more frequent servicing and premature component failure.

Under these materials handling conditions, therefore, conventional lift trucks require significant and additional operator skill and training, at best, and provide potential to damage a load or overheat the lift truck, at worst. The present invention addresses these and other problems associated with the prior art.

SUMMARY OF THE INVENTION

A method for controlling a power-shift transmission comprising controlling a vehicle travel speed by simultaneously slipping two or more clutch packs associated with opposing directions of vehicle travel and adjusting an engine speed, according to a programmed response associated with a change in one or more of the engine speed, a torque converter slip, a selected direction of vehicle travel, and an accelerator position.

The foregoing and other objects, features and advantages of the invention will become more readily apparent from the following detailed description of a preferred embodiment of the invention which proceeds with reference to the accompanying drawings.

DETAILED DESCRIPTION

Figure 1:
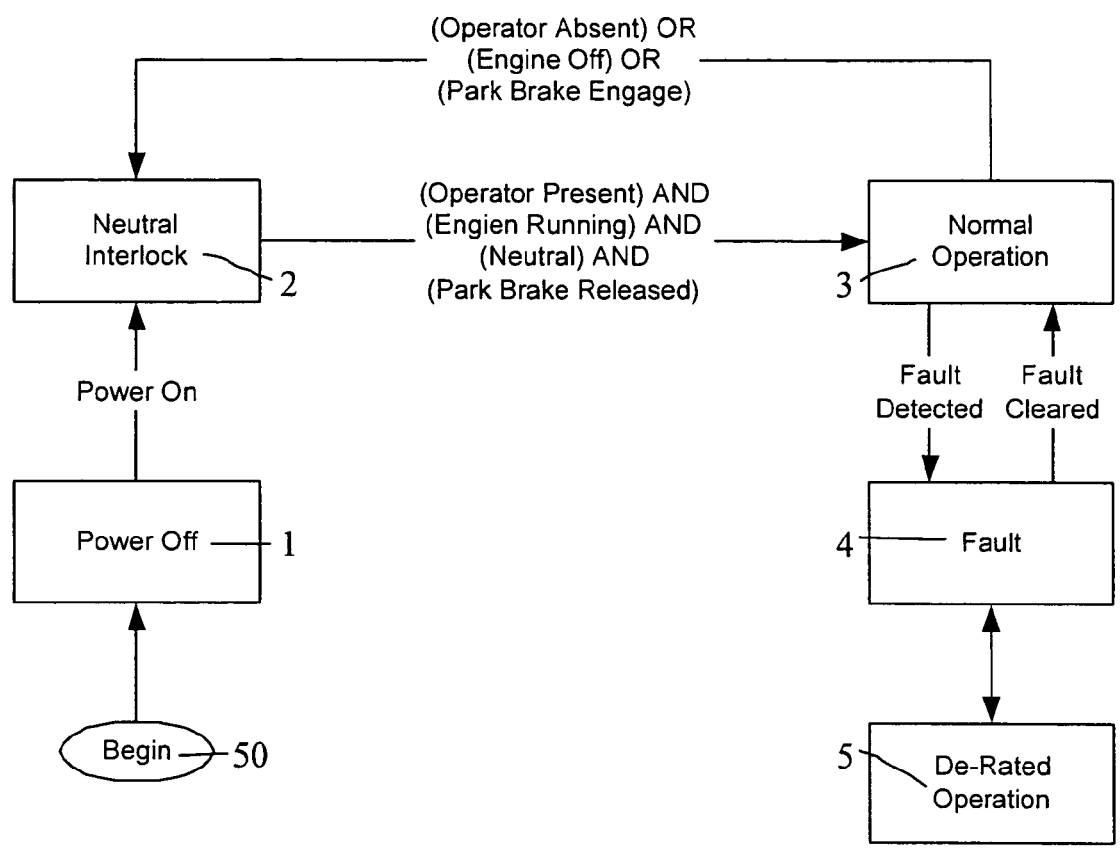
FIG. 1 is a top-level state transition diagram of the power-shift transmission control system.

The system described relates to a system providing electronic control of an advanced power-shift transmission 70, which provides functionality similar to a hydrostatic transmission. New designs and strategies for clutch modulation have been developed to enhance the functionality and performance of power-shift transmissions. This system provides improvements to conventional transmission control systems including: direct electronic pressure modulation, intelligent automatic clutch engagement, dynamic inching/brake pressure overlap adjustment, assisted engine governor control, pedal based speed control, and throttle-up control, among others. These innovations allow a VSM 30 (vehicle system manager) to modulate pressure supplied to both the forward (FWD) clutch pack 71 and reverse (REV) clutch pack 73 simultaneously for functions, such as engagement, inching, deceleration, braking, and load holding, which are not achievable with a conventional transmission design and control. By using independent electronic pressure modulation, the pressures of all the clutch packs are directly and individually modulated through proportional pressure reduction valves, which are electronically controlled by the VSM 30. The VSM 30 controls the electrical current of pressure reduction valves to modulate clutch pack pressures. The pressure of a clutch pack is proportional to its coil current. Electronic modulation offers at least three advantages: high filling pressure used to reduce filling time; different profiles customized for different clutch packs and requirements; and more than one clutch pack can be modulated simultaneously. Electronic pressure modulation can offer different modulation profiles applied for different loading conditions. Independent pressure modulation allows pressure overlap between forward low and high gears during up/down-shift. These two features are not available in conventional mechanical pressure modulation of the clutch packs. The pedal-based speed control 21 accelerates, decelerates, or brakes the vehicle travel speed to follow the accelerator speed command from the operator. The throttle-up control 20 modulates engine speed 87 to provide adequate pump flow for hydraulic controls. The two functions release the operator from conventional skill-demanding inching control and constant braking, which may cause knee strain after hours of operation.

The transmission control system operates in five top-level states: Power Off 1, Neutral Interlock 2, Normal Operation 3, Fault 4, and De-Rated Operation 5, as shown in the state transition diagram of FIG. 1. Starting with the Begin block 50, the system transitions to a Power Off state 1 in which the VSM 30 does not perform any function because no electrical power is being provided to the system. Lack of power may be the result of the system being deliberately turned off or because of a circuit failure. When the system is being powered up, no outputs are in a state that would initiate vehicle motion. If a FNR (forward-neutral-reverse) direction lever 94 or similar device, is installed, it is in the neutral position for engine start. If the FNR lever 94 is not in neutral, the starter does not crank the engine 74. The parking brake 86 or service brake 91 is applied to allow the starter to crank. If a FDC (foot direction control) pedal 95 or similar device, is installed, a parking brake 86 or service brake 91 is applied to allow the starter to crank. The dependency of park brake 86 and service brake 91 are enabled or disabled via a system programmable setting.

When electrical power is supplied and the system has been initialized, the VSM 30 runs a system check to determine if transmission engagement is allowable. The VSM 30 verifies three conditions: that the operator is present, which is determined by means of an operator presence sensor 92 or switch that may be located in an operator seat, handle, or floor plate, for example; that the engine 74 is running; and that the engine 74 is not in the process of cranking. If any of these three conditions not met, the VSM 30 prohibits the transmission 70 from engaging, and the system remains in a Neutral Interlock state 2. If, on the other hand, these three conditions are met, and additionally that the park brake 86, if equipped, has been released, the transmission 70 is allowed to enter a Normal Operation state 3.

The VSM 30 continually checks the Neutral Interlock state 2 conditions, and if any of them are not met, or if the parking brake 86 is engaged, the system returns to the Neutral Interlock state 2 until the conditions are once again met. The system is not required to transit from Normal Operation state 3 to Neutral Interlock state 2, just because the operator is absent. The operator-present dependency of neutral interlock may be programmed to be a requirement only when the system transits from Neutral Interlock state 2 to Normal Operation state 3, for example, but not the other way around. In addition, the VSM 30 runs a series of fault diagnostics on all major systems to determine proper functioning.

The VSM 30 detects faults continuously in the background on all of the outputs it controls and inputs it monitors. The VSM 30 ensured signals are within their valid range and reasonable in the context of other signals. Analog signals are tested for "out of range high" and "out of range low" conditions. Analog values are verified to be within expected ranges. If a major fault is detected, the VSM 30 suspends or de-rates the normal operation and inform the operator of the fault status using the display 37 and/or audible alarm. If a minor fault is detected, the VSM 30 continues transmission control and informs the operator of the fault status using the display 37 and/or audible alarm. If configured for it, the VSM 30 logs the fault.

Figure 3:
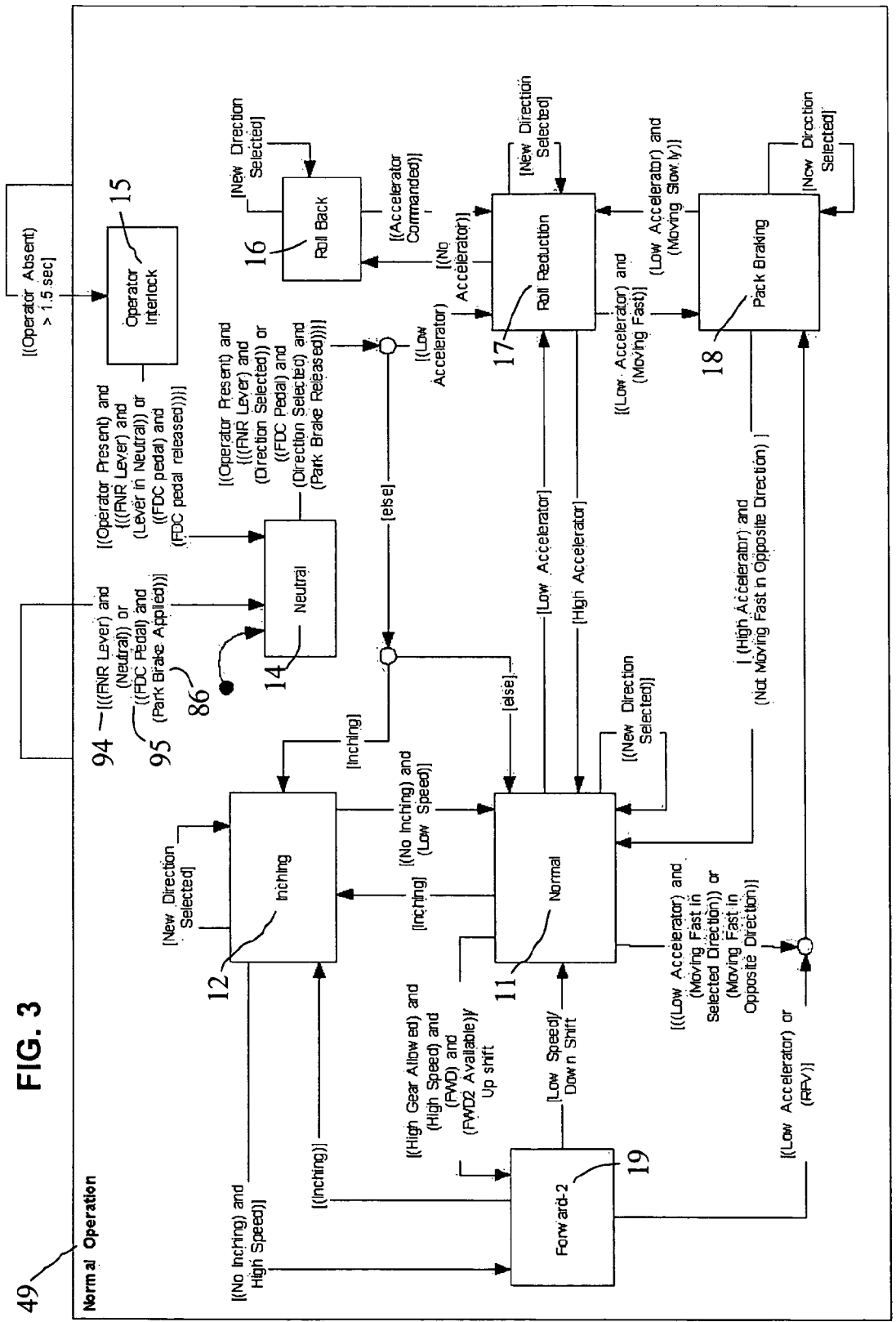
FIG. 3 is a state transition diagram of a second embodiment of the normal operation state, including a roll reduction sub-state.
Figure 4:
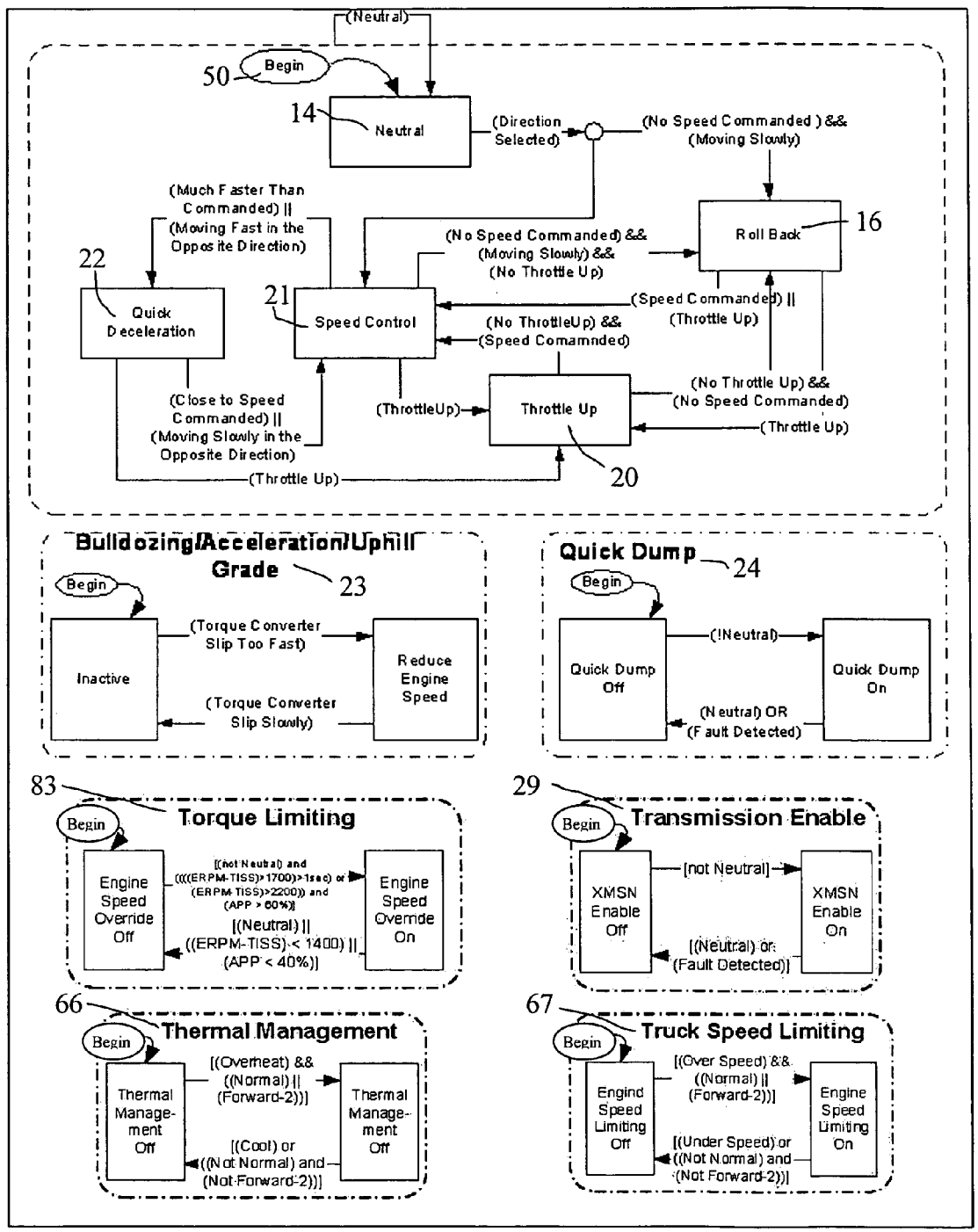
FIG. 4 is a state transition diagram of a third embodiment of the normal operation state, including a pedal based speed control function.

A fault tree is developed to indicate which functions are allowed based on the type and severity of fault detected. If a minor fault is detected, the VSM 30 allows a De-Rated Operation state 5; the system functions in a performance-limited state until the fault is corrected. When a minor fault is detected, the VSM 30 acknowledges the fault. If a major fault is detected, the VSM 30 does not allow de-rated operations, and all transmission functions are instead suspended. All outputs that would initiate vehicle motion are disabled. The De-Rated Operation state 5 allows only open-loop controls, in one embodiment. Operations that do not depend on feedback signals are allowed in the De-Rated Operation state 5. The Normal Operation state 3 may include a plurality of different modes, including Normal Operation 49, Torque Limiting 83, Transmission Enable 29, Thermal Management 66, Vehicle travel speed Limiting 67, Bulldozing 23 and Quick Dump 24, as shown in FIG. 3 and FIG. 4. These modes function in parallel simultaneously.

Figure 2:
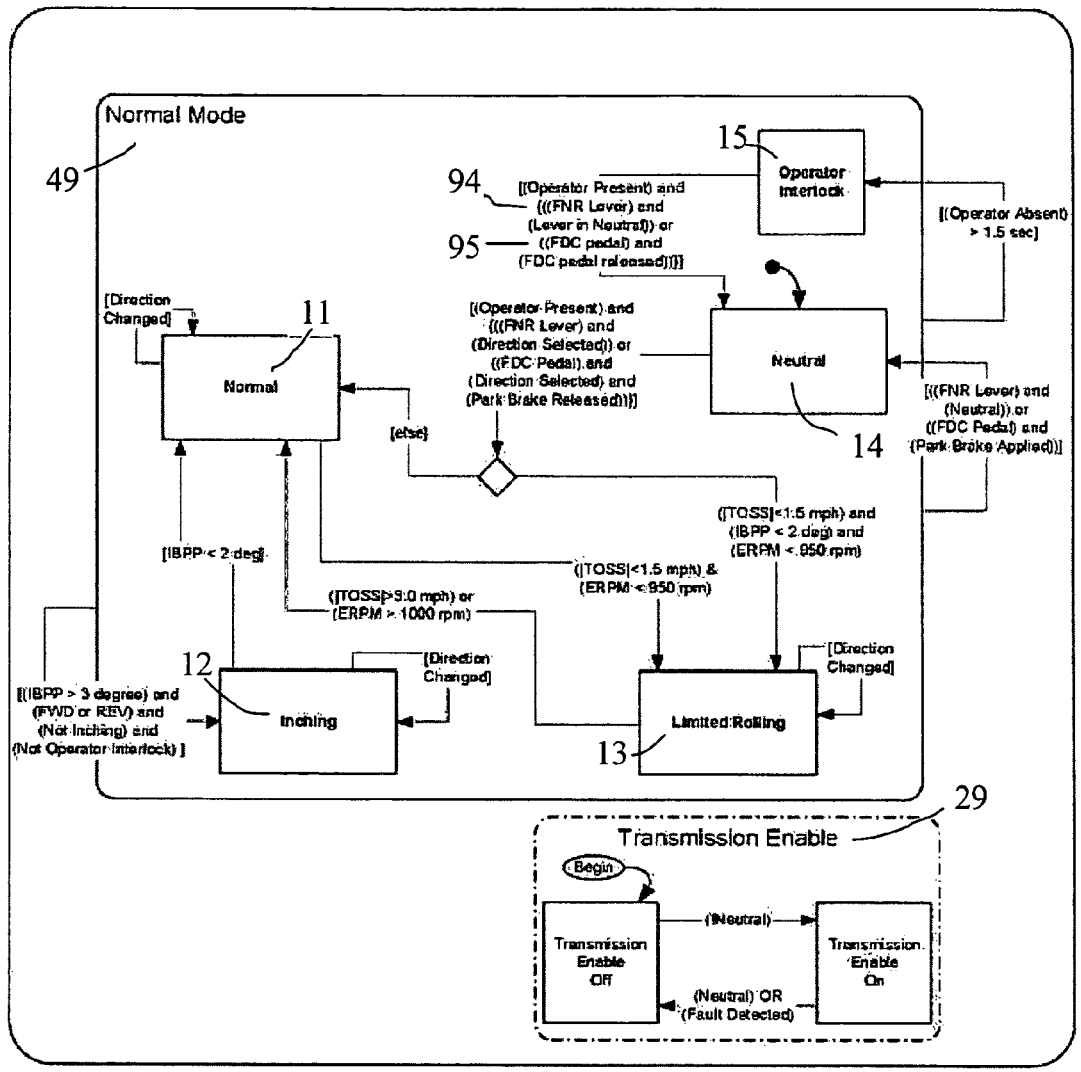
FIG. 2 is a state transition diagram of a first embodiment of the normal operation state, including a limited rolling sub-state.

Additional description of the transmission control modes is found in alternate embodiments as depicted in FIG. 2, FIG. 3, and FIG. 4. FIG. 2 shows a total of five sub-states associated with a Normal Operation mode 49, including: Neutral 14, Normal 11, Limited Rolling 13, Inching 12, and Operator Interlock 15. The VSM 30 provided in FIG. 2 shows a limited number of transmission control modes and sub-states which can be made available for applications that do not require the more advanced features and states shown in FIG. 3 and FIG. 4. The Normal Operation mode 49 as shown in FIG. 3 includes a total of eight sub-states associated with Normal Operation mode 49, including: Neutral 14, Normal 11 (Forward or Reverse), Forward2 19, Roll Back 16, Roll Reduction 17, Clutch pack Braking 18, Inching 12, and Operator Interlock 15. FIG. 4 depicts transmission control modes for a vehicle that includes pedal-based speed control 21 and hydraulic throttle-up 20 functionality. For this latter embodiment, there are a total of five sub-states associated with a Normal Operation mode 49, including Neutral 14, Roll Back 16, Quick Deceleration 22, Pedal Based Speed Control 21, and Throttle-Up 20.

Each block in the state transition diagrams is a state in which the transmission control system dwells until transiting to another state. When dwelling in a state, the VSM 30 executes the actions of the state in every control cycle. An arrow is a transition from one state to another. A transition occurs when the logic for one occurs. A small circle is not a state, but a logical branch.

Neutral 14 is the default sub-state of the Normal Operation mode 49. When the transmission control system transits from the Neutral Interlock state 2 to the Normal Operation state 3, the system starts at Neutral 14. In the Neutral 14 state both FWD clutch pack 71 and REV clutch pack 73 pressures are set to zero pressure. The Transmission Enable mode 29 is turned off so the quick-dump valve 38 is de-energized. The transmission-enable valve 36 is de-energized, which stops the supply of regulated pressure to the pressure reduction valves. Clutch packs 71, 72, and 73 are not pressurized even if a pressure reduction valve is stuck open. In the Neutral sub-state 14, the transmission 70 is at neutral, no direction (forward or reverse) is selected, and no clutch pack is pressurized or engaged. The system remains in neutral if the system has passed the Neutral Interlock state 2 but no direction has been selected. When the transmission 70 is in the Neutral sub-state 14, all clutch packs are disengaged. If a vehicle is equipped with a FNR lever 94, the operator selects neutral by shifting the FNR lever 94 into neutral. The transmission 70 does not go to neutral if the operator applies the park brake 86. If a vehicle is equipped with the FDC pedal 95, the operator is unable to select neutral after a direction is selected. In that case, with the vehicle powered on the transmission 70 returns to neutral only if the park brake 86 is applied. If the FDC pedal 95 is released after a direction is selected, the transmission 70 remains in the last selected direction. The VSM 30 remembers the last selected direction of the current power cycle after the park brake 86 is applied. The VSM 30 automatically re-engages the last selected direction if the park brake 86 is released after applied. The VSM 30 does not allow engagement if the operator is absent. However, if the operator becomes absent while the transmission 70 is already engaged (fully or partially), the VSM 30 shifts the transmission 70 to neutral.

In the Normal sub-state 11, the transmission 70 is engaged in either the forward or reverse direction, and the selected clutch pack pressure is modulated up and held high. The VSM 30 fully engages the transmission 70 in the selected direction (forward or reverse) if the system is in the Normal Operation mode 3, a direction has been selected, the inching/brake pedal 85 is released, and the operator is present. The VSM 30 engages the selected clutch pack with proper pressure modulation to ensure smooth engagement, but without reducing the service life of clutch packs. The VSM 30 limits the thermal energy absorbed into a clutch pack during engagement. If the engine speed 87 is at idle when a direction is selected, the VSM 30 smoothly engages the selected clutch pack. The VSM 30 more aggressively engages a selected direction if the engine 74 is operating at an elevated speed. If the vehicle is not moving fast when an opposite vehicle direction is requested (a low speed power reversal), the VSM 30 smoothly engages the selected clutch pack. If the vehicle is moving fast when an opposite vehicle direction is requested (a high speed power reversal), the VSM 30 quickly engages the selected clutch pack to limit thermal energy absorbed into the selected clutch pack.

With the transmission control system in the Normal sub-state 11, the VSM 30 modulates up and keeps the selected clutch pack pressure high. The system may transit into the Normal sub-state 11 from Neutral 14, Limited Rolling 13, and Inching 12, as shown in FIG. 2, or additionally may transit into the normal sub-state 11 from Forward2, Roll Reduction 17, and Clutch pack Braking 18 as shown in FIG. 3. The VSM 30 handles the transition depending on the previous state. When the transition is complete, the VSM 30 holds the selected clutch pack pressure at the final modulation pressure. Regardless of the previous state, the VSM 30 always modulates the selected clutch pack to the full pressure, while keeping the opposite clutch pack pressure low. If the previous sub-state is Roll Reduction 17, the VSM 30 maintains the final pressure of the opposite clutch pack for approximately 3 seconds, until the engine speed 87 is higher than approximately 1200 RPM, or until the vehicle travel speed is faster than approximately 3 MPH, whichever comes first. The selected clutch pack pressure is modulated up to the full pressure as a function of time. If the initial pressure of the selected clutch pack is higher than the entry pressure level in the modulation profile, the pressure modulation starts from a pressure equal to or higher than the initial pressure level, instead of the entry level. That is, the clutch pack pressure is not reduced during the modulation. When the system enters the Normal sub-state 11, the selected clutch pack might already have some pressure from clutch pack braking. If the system starts with a modulation pressure that is less than the initial pressure, the vehicle may slow down, instead of speeding up. Engine speed 87 and vehicle travel speed discussed above and below are system programmable.

Operator Interlock 15 is the state of Normal Operation 3 where the operator is absent. In the Operator Interlock state 15, functionality of the transmission 70 is dependent on operator presence during normal operations. If the operator is absent from the seat for more than approximately 1.5 seconds, for example, during normal operations, the transmission 70 is shifted to neutral. All direction inputs from the FNR lever 94 or FDC pedal 95 are ignored while in the Operator Interlock 2 state. The operator is informed of the status of the transmission 70 and required operations to exit the Operator Interlock 15 state, by means of information provided on a display 37. If the operator returns to the seat and the FNR Lever 94 is in neutral or the FDC pedal 95 is released, operation is returned to the Normal Operation 3 mode and the display 37 is cleared. Variables and constants, such as the length of time the operator may be absent from the seat, may be system programmable.

In the Operator Interlock state 15, the transmission 70 is shifted to neutral regardless of FNR lever 94 or FDC pedal 95 direction inputs if the operator is absent and the vehicle is in a state of normal operation. In the Operator Interlock 15 state, both the FWD clutch pack 71 and the REV clutch pack 73 pressures are set to zero pressure, and the Transmission Enable mode 29 is turned off. The transmission-enable valve 36 is de-energized, which stops the supply of regulated pressure to the pressure reduction valves. Command inputs from the FNR lever 94 and FDC pedal 95 are ignored by the VSM 30. The transmission-enable valve 36 has a normal off design that ensures the transmission 70 goes to neutral if the power to the transmission-enable valve 36 fails.

Other types of vehicle direction control devices may be used for the FNR lever 94 and FDC pedal 95 other than levers and pedals, such as a joystick or button, and are anticipated and included as being compatible with the system described herein. Acceleration of the vehicle is commanded by the operator by means of an accelerator pedal, foot directional control pedal, joystick, or other means of vehicle control. This system is compatible with any means of controlling acceleration, however one embodiment, as provided in this description, discusses the control as being an acceleration pedal for convenience. As such, a low accelerator command is achieved by depressing the accelerator 81 only slightly more than the released position, which results in a low vehicle travel speed. The released position may nevertheless allow low vehicle travel speed depending on the transmission control system option and slope of the ground, but generally is considered to not be requesting any vehicle acceleration. A high accelerator command is achieved by depressing the accelerator 81 an additional amount beyond the low accelerator command up to and including fully depressing the accelerator 81. A high accelerator command results in a high vehicle travel speed. Fully depressing the accelerator 81 results in an accelerator command for maximum vehicle acceleration. Accelerator pedal positions, and inching/brake pedal positions described in terms of degrees or percentages are measured from the fully released position, or zero degrees and zero percent.

In the Forward2 sub-state 19, the transmission 70 is engaged in the forward high gear with high accelerator command. The vehicle is moving fast in the selected direction. An up-shift transition occurs when the transmission 70 is in a transition of disengaging the FWD clutch pack 71 and engaging a FWD2 (forward high gear, or forward2) clutch pack 72, and a down-shift transition occurs when the transmission 70 is in a transition of disengaging the FWD2 clutch pack 72 and engaging the FWD clutch pack 71. The VSM 30 transits to the Forward2 sub-state 19 from either the Normal sub-state 11 or Inching sub-state 12. The VSM 30 up-shifts the transmission 70 when transiting from the Normal sub-state 11 and down-shifts the transmission 70 when transiting to the Normal sub-state 11.

In the Limited Rolling sub-state 13, the transmission 70 is engaged in either the forward or reverse direction with speed control devices, such as an accelerator 81 and inching/brake pedal 85, released and not requesting any vehicle acceleration. When the vehicle is on level ground and the operator selects a travel direction and the vehicle is not moving fast and no controls for the driving speed are activated, the VSM 36 limits the vehicle rolling speed below 1.5 MPH. Limited Rolling 13 control does not interfere with normal driving, braking, and inching operations and does not create abrupt changes to vehicle travel speed. The VSM 30 gradually applies or removes the braking effort, so the operator does not feel an abrupt change of vehicle travel speed. If a vehicle is coasting (cruising at high speed with the transmission 70 engaged and both the accelerator 81 and inching/brake pedal 85 released) above approximately 1.5 mph, the VSM 30 does not apply Limited Rolling 13 to slow down the vehicle travel speed, and instead allows the vehicle to free coast. Limited Rolling 13 does not create extra drag to the engine at high engine speed 87 and does not diminish as the engine speeds up. Limited Rolling 13 is not required to hold the vehicle stationary on flat ground or grade, and does not drive the vehicle on flat ground in the opposite direction.

Figures 8, 9:
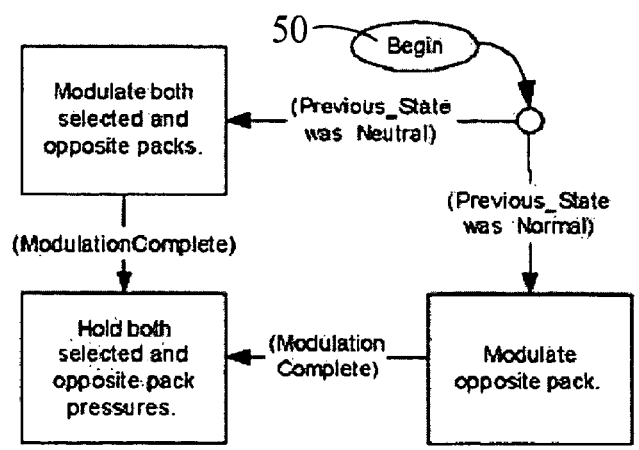
FIG. 8 is a chart showing the sub-state selections according to operator input and vehicle travel speed.
FIG. 9 is a state transition diagram for a limited rolling sub-state.

The system enters the Limited Rolling sub-state 13 from the Neutral sub-state 14 or the Normal sub-state 11 if the operator is present, a direction is selected, the park brake 86 (if any) is released, the vehicle travel speed is less than approximately 1.5 MPH, the engine speed 87 is less than approximately 950 rpm, and the inching/brake pedal 85 is depressed less than approximately 2 degrees. The system transits from Limited Rolling 13 to Neutral 14 if the FNR lever 94 is installed and no direction is selected, or the FDC pedal 95 is installed and the park brake 86 is applied. The system transits from Limited Rolling 13 to Normal 11 if the vehicle travel speed is more than approximately 3.0 MPH or the engine speed 87 is greater than 1000 rpm. The system transits from Limited Rolling 13 to Inching 12 if the inching/brake pedal 85 is applied more than approximately 3 degrees and the forward or reverse direction select is active. The state-transition diagram of Limited Rolling 13 is shown in FIG. 9. The initial action of Limited Rolling 13 depends on the previous sub-state, from which the system transits into the Limited Rolling sub-state 13. If the system transits from the Neutral sub-state 14, both selected and opposite clutch packs are empty and a filling and modulation of the clutch packs is initiated. The pressure profile includes quick filling at the beginning of modulation. Three modulation profiles are defined for the selected clutch pack for high, medium, and low speed engagements. Once the pressure modulations of the FWD clutch pack 71 and the REV clutch pack 73 are complete, both clutch pack pressures are held at their final modulation pressure levels. If the system transits from the Normal sub-state 11, the selected clutch pack is already at its high final modulation pressure. If the opposite clutch pack is empty, the VSM 30 fills and modulates the opposite clutch pack pressure. The selected clutch pack does not need modulation. Once the modulation of the opposite clutch pack is complete, the system transits to a pressure-holding mode.

Figure 10:
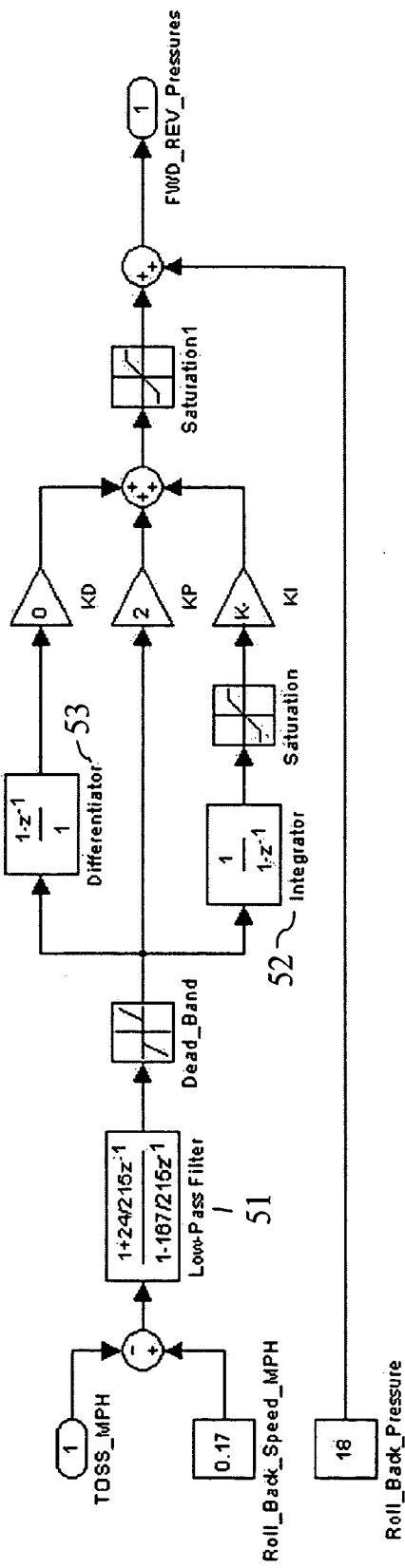
FIG. 10 is a schematic of a closed-loop PID control for a roll back sub-state.

In the Roll Back sub-state 16, the transmission 70 is engaged in either forward or reverse direction with no accelerator command. The vehicle is stationary on a level surface and has limited roll back speed on a grade depending on the angle and the load. The Roll Back 16 provides controlled roll back speed on steeper grades if both the accelerator 81 and inching/brake pedal 85 are released. This function provides a limited roll back speed on higher grades as an additional visual cue to the operator that either the service brake 91 or parking brake 86 is not applied. If a direction is selected with accelerator 81 released, the VSM 30 applies equal low pressures on both selected and opposite clutch packs such that the vehicle stays static on level ground and on a grade up to approximately 5%. On a steep grade, the vehicle rolls slowly (forward or backward) downhill. The VSM 30 actively controls the rolling speed to not more than 3 inches/second, for example. The engine 74 remains at low idle, since the accelerator 81 is released. Roll back speed on a steep grade can be adjusted according to the amount of pressure applied to the clutch packs, and is a system programmable feature. Pressures are increased or decreased when the vehicle travel speed is above or below the target speed, respectively. A closed-loop PID (Proportional, Integral, and Differential) is used to control the roll back speed, and is shown in FIG. 10. The vehicle travel speed is compared against the target roll back speed. The control error is the difference between the target speed, for example 0.17 MPH, and the present speed. The control error is filtered through a low-pass filter 51 to reject high-frequency noise. The control error is set to zero if the error is smaller than the hysteresis, which is an approximately 0.01 MPH dead band. The control error is fed to an integrator 52 and a differentiator 53 to calculate the accumulated and differential errors, respectively. The proportional, integral, and differential errors are multiplied with their respective gains and are summed together as the control pressure, in addition to a minimum rollback pressure, which for one embodiment is approximately 18.5 PSI for the FWD clutch pack 71 and 20.5 PSI for the REV clutch pack 73. The control pressure is clipped between zero and a maximum additional pressure such as 10 PSI. That is, pressures provided to both clutch packs are not less than the minimum rollback pressure. The rollback pressure determines the grade that a vehicle rolls back. If the pressure is set too high, the vehicle does not roll back on steep hills. If the pressure is set too low, the vehicle does not hold stationary on minor hills. The maximum additional pressure, or control pressure, determines the maximum grade holding capacity. When the operator presses the accelerator 81 slightly, the system transits to the Roll Reduction sub-state 17.

In the Roll Reduction sub-state 17, the transmission 70 is engaged in either the forward or reverse direction with low accelerator command, such that the vehicle moves slowly. This feature provides smooth predictable control of low vehicle travel speed on flat and low grades without using the service brake 91. If a direction is selected with low accelerator command, the engine controller 35 keeps the engine speed 87 low and engage both selected and opposite clutch packs, so the vehicle travel speed can be controlled by the APP 81 (accelerator pedal position, instead of free rolling. On level ground, the VSM 30 allows the operator to use the accelerator 81 to control vehicle travel speed smoothly between zero and free-rolling speed without delay. Free-rolling speed is the maximum vehicle travel speed with the engine 74 at idle. In one embodiment, the free-rolling speed of the vehicle is approximately 3 MPH.

Figure 12:
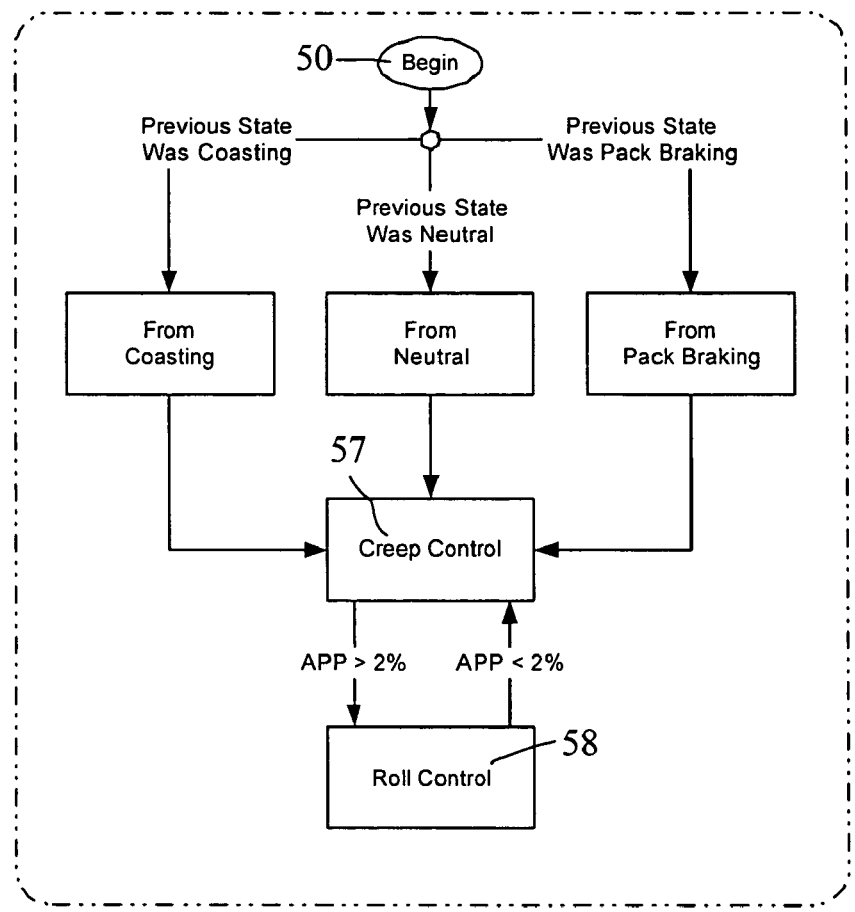
FIG. 12 is a state transition diagram for a roll reduction state.

Roll Reduction 17 permits the vehicle to roll as the APP 81 is increased slightly and while still controlling maximum rolling speed. When the operator increases the APP 81 slightly, for example at an angle of between 2% and 30% from the released position, Roll Reduction 17 reduces the opposite clutch pack pressure as a function of the APP. The rate of change of the opposite clutch pack pressure is limited so that the vehicle does not accelerate abruptly. When the APP 81 exceeds the roll reduction threshold value, the system transits to the Normal sub-state 11, which fully engages the selected clutch pack and drops the pressure to the opposite clutch pack. The clutch pack pressure of the opposite clutch pack, however, is not fully reduced to zero immediately, but maintained at a low final pressure, until one of the following three conditions satisfied: the vehicle travel speed exceeds approximately 3 MPH; the engine speed 87 is higher than approximately 1200 RPM; or it has been more than approximately 3 seconds with the APP 81 greater than 30%. When one of the three condition is true, the opposite clutch pack pressure is fully reduced to zero. The system exits from the Roll Reduction sub-state 17 and enters the Normal sub-state 11. The State Transition Diagram of Roll Reduction 17 is show in FIG. 12.

The initial action in the Roll Reduction sub-state 17 depends on the previous sub-state from where the system transits. After the initial action, Roll Reduction 17 is controlled by either the Creep Control mode 57 or Roll Control mode 58, depending on the APP. If the APP 81 is greater than 20%, for example, the system transits out of the Roll Reduction sub-state 17 and enters the Normal sub-state 11, in either the forward or reverse direction. After the initial pressure modulation of Roll Reduction 17 is over, the system transits into the Creep Control mode 57, which limits the vehicle to a desired speed if the vehicle does roll. If the APP 81 is greater than 2%, the Creep Control mode 57 is suspended and the Roll Control mode 58 is activated. The Creep Control mode 57 initially maintains the opposite clutch pack pressure at the final modulation pressure. If the vehicle rolls faster than the desired speed by a threshold, the Creep Control mode 57 actively limits the vehicle travel speed. If the vehicle travel speed is higher than the desired creep speed, the opposite clutch pack pressure is increased to brake the vehicle. If the vehicle travel speed is slower than the desired creep speed, the opposite clutch pack pressure is reduced to accelerate the vehicle. A PID closed-loop PID control is applied to adjust the opposite clutch pack pressure up or down to smoothly modulate the vehicle creep speed. However, the opposite clutch pack pressure is allowed to vary only between the minimum pressure set in the Roll Control mode 58 and below a threshold above the minimum pressure. All of the parameters for Creep Control 57 and Roll Control 58 are system programmable.

Clutch pack braking is the process of partially engaging two or more clutch packs to create a braking effort on the transmission output shaft. In the Pack Braking sub-state 18, the transmission 70 is engaged in either forward or reverse direction and the vehicle is traveling fast in the selected direction with low accelerator command (low acceleration clutch pack braking) or in the opposite direction with high accelerator command (power reversal clutch pack braking). Opposing clutch pack pressure is applied to provide transmission braking in addition to engine compression braking. In addition, this feature provides controlled roll back speed on steeper grades if both the accelerator 81 and inching/brake pedal 85 are released. This function provides a limited roll back speed on higher grades as an additional visual cue to the operator that either the service brake 91 or parking brake 86 is not applied. The engine 74 remains at low idle, since the accelerator 81 is released One benefit of clutch pack braking is that all partially engaged clutch packs share the braking load (heat), which otherwise is absorbed by only one clutch pack in conventional systems. One embodiment executes the clutch pack braking process via the VSM 30 or an electronic controller. The VSM 30 closely monitors the braking speed and limits the rate of change of the braking speed so that a controlled deceleration rate is managed. Distribution of energy between clutches is also managed by the VSM 30. With electronic clutch pack braking, both the FWD clutch pack 71 and REV clutch pack 73 are partially engaged to generate braking effort. The clutch pack pressures are actively modulated to maintain the output speeds of the torque converter 75, so the load on the torque converter 75 is minimized.

Clutch pack braking actively reduces the vehicle travel speed by engaging two or more of the FWD clutch pack 71, the REV clutch pack 73, and the FWD2 clutch pack 72, if installed. Clutch pack braking may partially engage all clutch packs so that all clutch packs are braking and equally absorbing the heat load. The 18 may be applied for at least two applications, including low acceleration clutch pack braking and power reversal clutch pack braking. Low acceleration clutch pack braking may be activated in a variety of pre-defined conditions, for example if the operator reduces the accelerator command below 15% and vehicle travel speed is above 3 MPH, or the operator reduces the accelerator command below 30% and the vehicle travel speed is above 9 MPH. Power reversal clutch pack braking is activated if the operator selects a new direction when the vehicle travel speed is more than a predefined speed, for example 3 MPH, with deceleration inversely proportional to the APP 81, and where increased accelerator actuation yields higher deceleration. For either low acceleration or power reversal clutch pack braking applications, clutch pack braking decelerates vehicle travel speed to a lower value, for example 2 MPH, before the system transits to either the Roll Reduction sub-state 17 or the Normal sub-state 11, respectively. Low acceleration clutch pack braking provides maximum braking effort when the operator fully releases the accelerator 81. Power reversal clutch pack braking provides maximum braking effort when the operator fully depresses the accelerator 81.

In the Pack Braking sub-state 18, the engine speed 87 is governed down to its idle speed to minimize heat generated by the torque converter 75. Clutch pack braking uses clutch packs to absorb vehicle kinetic energy. Clutch packs have limited heat capacities. If the engine 74 stays at high speed, especially during power reversal, there is more energy for clutch packs to absorb. Therefore, the engine speed 87 is commanded to low idle as soon as possible and kept there during clutch pack braking. Since the engine 74 is governed down, it also provides engine braking to absorb kinetic energy, though it is limited. A disadvantage of governing down the engine speed 87 is that the engine 74 is more likely to stall if there is too much braking torque applied to it. Therefore, the TISS 89 (transmission input shaft speed) should not be too low or in the opposite direction against the engine 74. The PID control parameters of TISS control are tuned to prevent engine stall. A one-speed transmission has one FWD clutch pack 71 and one REV clutch pack 73. A two-speed transmission has one FWD clutch pack 71, one FWD2 clutch pack 72 and one REV clutch pack 73. The two transmission types use different clutch pack braking strategies to achieve optimal heat distribution during clutch pack braking.

The control strategy of a one-speed transmission is to partially engage the opposite clutch pack to create braking. The opposite clutch pack corresponds to the direction that is opposite to vehicle travel direction. The braking torque is proportional to the pressure of the opposite clutch pack. The control of vehicle deceleration, called TOSS control, modulates the opposite clutch pack pressure to maintain TOSS 88 (transmission output shaft speed) proportional to operator's command. There are three or more possible control strategies for the selected clutch pack pressure: fully released, fully engaged, and partially engaged. If the selected clutch pack is fully released, the braking torque of the opposite clutch pack can drive the torque-converter output shaft in the opposite direction against the engine 74 and potentially stall the engine 74. If the selected clutch pack stays fully engaged, it does not absorb any energy and leaves the opposite clutch pack to absorb all of the energy, which may be too much for one clutch pack. Therefore, one strategy is to partially engage the selected clutch pack. The selected clutch pack corresponds to the direction of vehicle travel. It is partially engaged to maintain the TISS 89, which is also the torque-converter output speed, at a low speeds. The higher TISS 89 is, the less slip there is on the selected clutch pack. The lower TISS 89 is, the more slip there is on the selected clutch pack, and the more torque against the governed-down engine 74 at idle. The desired low speed for TISS 89 is between 200 and 400 revolutions per minute, depending on the embodiment.

The Pack Braking sub-state 18 starts with reducing the pressure of the selected clutch pack to a predefined low level, pre-filling the opposite clutch pack, and then increasing the pressure of the opposite clutch pack according to the accelerator command. The opposite clutch pack pressure is the nominal pressure applied for braking as the feed-forward term of TOSS control. To ensure consistent deceleration regardless of the grade and load conditions, the opposite clutch pack pressure is modulated through the TOSS control. TOSS control maintains the vehicle deceleration as defined in the mapping to the APP. For power reversal clutch pack braking, the maximum braking occurs when the accelerator 81 is fully pressed, instead of released. Therefore, the APP 81 of power reversal clutch pack braking is converted to the APP 81 of low-throttle clutch pack braking before calculating the opposite clutch pack pressure and desired deceleration. The conversion is based on the formula:

low throttle clutch pack braking APP=[(100−power reversal clutch pack braking APP) ×30]/100

This formula may be applied to convert the APP 81 during power reversal clutch pack braking. At the same time the opposite clutch pack is being filled, the VSM 30 starts to modulate the pressure of the selected clutch pack through a PID control loop, called TISS control, to maintain TISS 89 at a desired low speed of 200 RPM during clutch pack braking. If TISS 89 is below the desired speed, the selected clutch pack pressure is increased. If TISS 89 is above the desired speed, the selected clutch pack pressure is decreased. Clutch pack braking control stops when the TOSS 88 is less than 2.0 MPH. Then the system transits out of the Pack Braking sub-state 18 to either the Roll Reduction sub-state 17 or the Normal sub-state 11, depending on the direction selected and the engine throttle position 90. If APP 81 is less than approximately 30%, the system transits to the Roll Reduction sub-state 17. If APP 81 is higher than approximately 30%, the system transits to the Normal sub-state 11.

The system may also transit from the Pack Braking sub-state 18 to the Roll Reduction sub-state 17 or the Normal sub-state 11 (forward or reverse) based on the gear selection and the vehicle travel speed. The system transits to the Normal sub-state 11 if the APP 81 is greater than approximately 15%, and the vehicle is moving slower than approximately 0.5 mph, in a direction opposite to the selected clutch pack. The system transits to the Roll Reduction sub-state 17 if neutral is selected, or the APP 81 is less than 15% and the vehicle is moving slower than 0.5 mph in either direction.

The difference between one-speed and two-speed clutch pack braking is that two-speed clutch pack braking does not require TISS control and distributes the heat between the opposite clutch pack and the FWD2 clutch pack 72, instead of the selected clutch pack. A two-speed transmission has three clutch packs: FWD clutch pack 71, REV clutch pack 73, and FWD2 clutch pack 72. The three clutch packs are typically of the same size and have the same lube/cooling capacity. Any two clutch packs, if not all, can be applied for clutch pack braking to share the thermal load. Slipping all three clutch packs during clutch pack braking distributes heat equally among all three clutch packs, so there is less chance to have one clutch pack overheated. However, to slip all three clutch packs equally, the TISS 89 stays low, which reduces the lube/cooling flow supply. The transmission charge pump is driven at the speed of TISS 89. Therefore, one embodiment is not to slip all three clutch packs, but to keep the selected clutch pack fully engaged to keep the TISS 89 high during clutch pack braking. As a result, only the opposite clutch pack and the FWD2 clutch pack 72 are slipped to share the heat equally.

Although the selected clutch pack remains engaged, it is preferable to not engage the selected clutch pack with full pressure in order to provide for transmission protection and protect the system from overload. During clutch pack braking, if the opposite clutch pack and FWD2 clutch pack 72 are over-pressurized due to mechanical or electrical failure, it is preferable to allow the selected clutch pack to slip to minimize the possibility of transmission mechanical failure. If the clutch pack-braking load becomes too heavy, it is preferable to temporarily share the heat load among all three clutch packs. For these two reasons, the selected clutch pack can be pressurized to a fixed medium pressure, for example 30 PSI, which is sufficient for most light and medium duty applications of clutch pack braking. If the TOSS control increases the braking load higher to meet the desired deceleration, the selected clutch pack starts to slip. The VSM 30 applies a constant pressure to the selected clutch pack. A closed-loop TISS control is not required. The constant pressure is set to the minimum pressure that locks the selected clutch pack during clutch pack braking with rated load. The constant selected-clutch pack pressure is system programmable. The VSM 30 modulates the pressures of both the opposite clutch pack and the FWD2 clutch pack 72 to control the deceleration of TOSS 88. The VSM 30 implements a PID closed-loop control to control the deceleration of TOSS 88 as a function of the APP 81, which is controlled by the operator. The pressure of the opposite clutch pack (REV clutch pack 73 for forward vehicle direction and FWD clutch pack 71 for reverse vehicle direction) is controlled by the PID control to control the deceleration. For example, in order to provide equal heat distribution, the VSM 30 can pressurize the FWD2 clutch pack 72 with a pressure that is approximately 5.5 and approximately 1.22 times the pressure applied to the opposite clutch pack for forward and reverse clutch pack braking, respectively. The pressure ratios are functions of gear ratios. The FWD2 clutch pack 72 absorbs the same amount of braking heat as the opposite clutch pack. Braking heat is the multiplication of the clutch pack pressure and clutch pack slip.

At the beginning of clutch pack braking, if the transmission 70 is in low gear, the VSM 30 quick fills both of the opposite clutch pack and the FWD2 clutch pack 72 in readiness for pressure modulation. If the transmission 70 is in high gear (forward only), the VSM 30 decreases the pressure provided to the FWD2 clutch pack 72 to a predefined value, for example 20 PSI, and quick fill both the FWD clutch pack 71 and the REV clutch pack 73 in preparation for pressure modulation. During clutch pack braking, the current control of the FWD2 coil 32 and the REV coil 33 is turned off. A fixed current-duty-cycle gain, which is the ratio between PWM (Pulse-Width-Modulation) duty cycle vs. desired current, is applied to calculate the command of a PWM duty cycle. The current-duty-cycle gains of the REV coil 33 and the FWD2 coil 32 are calculated before the closed-loop current control is turned off.

Figure 14:
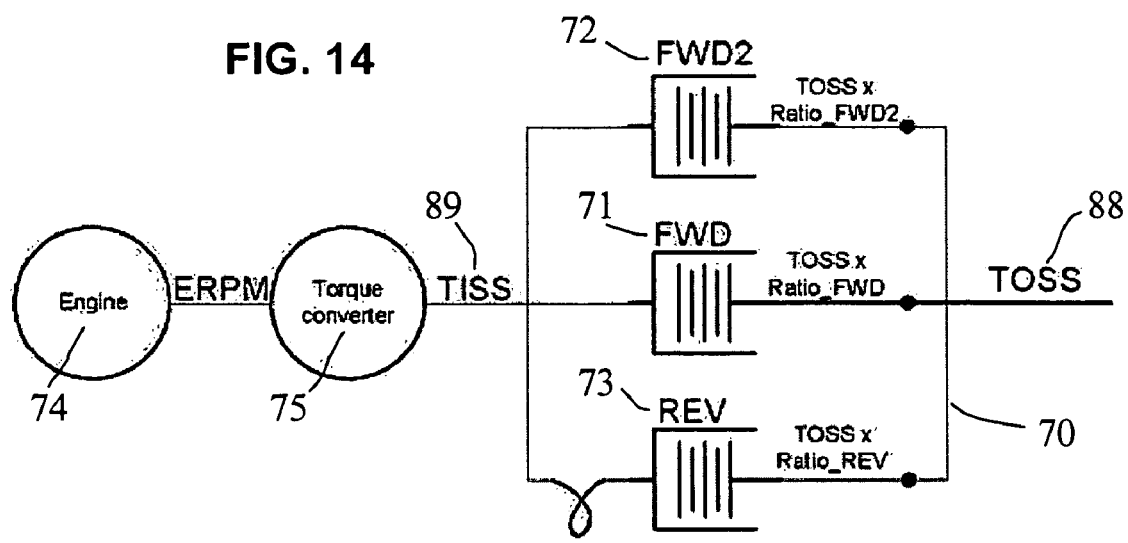
FIG. 14 is a block diagram providing illustration for determining shaft speeds of a two speed transmission system.

During clutch pack braking of a two-speed transmission, the FWD2 clutch pack 72 is provided a pressure higher than the opposite clutch pack to share the clutch pack braking heat. The equations below show the pressure gain of the FWD2 clutch pack 72 that ensures equal heat absorption between the FWD2 clutch pack 72 and the opposite clutch pack. According to FIG. 14, transmission shaft speeds may be determined according to the slip rates of the three clutch packs which are defined as:

$$\text{FWD clutch pack slip} = \text{TISS} - \text{TOSS} \times \text{Ratio\_FWD}$$

$$\text{FWD2 clutch pack slip} = \text{TISS} - \text{TOSS} \times \text{Ratio\_FWD2}$$

$$\text{REV clutch pack slip} = \text{TISS} + \text{TOSS} \times \text{Ratio\_REV}$$

Ratio_FWD is the gear ratio for the low forward gear, Ratio_FWD2 is the gear ratio for the high forward gear, when installed, and Ratio_REV is the gear ratio for the reverse gear.

For forward clutch pack braking, the FWD clutch pack pressure is just high enough to lock the FWD clutch pack 71, so that there is no slip. In order for the energy absorbed by the REV clutch pack 73 and the FWD2 clutch pack 72 to be equal, the FWD2 clutch pack pressure is set higher than the REV clutch pack pressure. For forward clutch pack braking, the relationships between pack slip rates and clutch pack pressures are determined according to the following formulas:

$$\text{TISS} = \text{TOSS} \times \text{Ratio\_FWD}$$

$$\text{FWD clutch pack pressure} \times \text{FWD2 clutch pack slip} = \text{REV clutch pack pressure} \times \text{REV clutch pack slip}$$

$$\text{FWD2 clutch pack slip} = \text{TOSS} \times (\text{Ratio\_FWD} - \text{Ratio\_FWD2})$$

$$\text{REV Clutch pack slip} = \text{TOSS} \times (\text{Ratio\_FWD} + \text{Ratio\_REV})$$

$$\text{FWD2 clutch pack pressure} = \text{REV clutch pack pressure} \times (\text{Ratio\_FWD} + \text{Ratio\_REV})/(\text{Ratio\_FWD} - \text{Ratio\_FWD2})$$

For reverse clutch pack braking, the REV clutch pack pressure is just high enough to lock the REV clutch pack 73, so that there is no slip. In order for the energy absorbed by the FWD clutch pack 71 and the FWD2 clutch pack 72 to be equal, the FWD2 clutch pack pressure is set higher than the FWD clutch pack pressure. For reverse clutch pack braking, the relationships between pack slip rates and clutch pack pressures are determined according to the following formulas:

$$\text{TISS} = -\text{TOSS} \times \text{Ratio\_REV}$$

$$\text{FWD 2 clutch pack pressure} \times \text{FWD2 clutch pack slip} = \text{FWD clutch pack pressure} \times \text{FWD clutch pack slip}$$

$$\text{FWD2 clutch pack slip} = \text{TOSS} \times (-\text{Ratio\_REV} - \text{Ratio\_FWD2})$$

$$\text{FWD clutch pack slip} = \text{TOSS} \times (-\text{Ratio\_REV} - \text{Ratio\_FWD})$$

$$\text{FWD2 clutch pack pressure} = \text{FWD clutch pack pressure} \times (\text{Ratio\_REV} + \text{Ratio\_FWD})/(\text{Ratio\_REV} + \text{Ratio\_FWD2})$$

The Inching sub-state 12 allows the operator to modulate the selected clutch pack pressure to slow the vehicle travel speed while keeping the engine 74 at a high enough speed to provide a sufficient hydraulic flow rate for hydraulic operations. In the Inching sub-state 12, the VSM 30 reduces the selected clutch pack pressure when the operator applies the inching/brake pedal. The reduction of selected clutch pack pressure is proportional to the IBPP 85 (inching/brake pedal position). There can be an overlap between the clutch pack pressure and brake pressure. That is, brake pressure may be increased to the point that vehicle braking begins before the selected clutch pack pressure is reduced to zero. Inch/brake overlap improves vehicle travel speed controllability on uphill ramps. However, too much overlap, may reduce engine power available for hydraulic operation. The inching/brake pedal 85 may be adjusted such that the brake pressure builds up slowly in the first half of inching/brake pedal displacement, and then increases rapidly in the second half as brake shoes come in contact with a brake drum. In general, brake pressure is proportional to the IBPP 85. However, the brake pressure of a given service brake position may change as brake shoes wear or get hot. The result is that for conventional systems, the inch/brake overlap is provided constant adjustment to maintain the desired setting.

Electronic inching provided in the system is designed to maintain consistent pressure overlap automatically. Electronic inching measures the shift in measured brake pressure corresponding to the IBPP 85, and compensates for it. Electronic inching detects the reference IBPP 85, called an "anchor point," at which the brake pressure reaches a specified target pressure, called an "anchor pressure." In one embodiment, the anchor point is updated constantly with an adjustable learning rate equal to approximately 1/10 of the difference between new and old anchor points, whenever the brake pressure passes through the anchor pressure from low to high. The inching pressure profile is defined with respect to the anchor point, not the absolute position of the IBPP 85. This relative design ensures constant pressure overlap. The newly learned anchor point is stored during system power down, and is then retrieved as the initial anchor point during the next system power on cycle. The anchor point update is suspended if the park brake 86 is applied.

Figure 13:
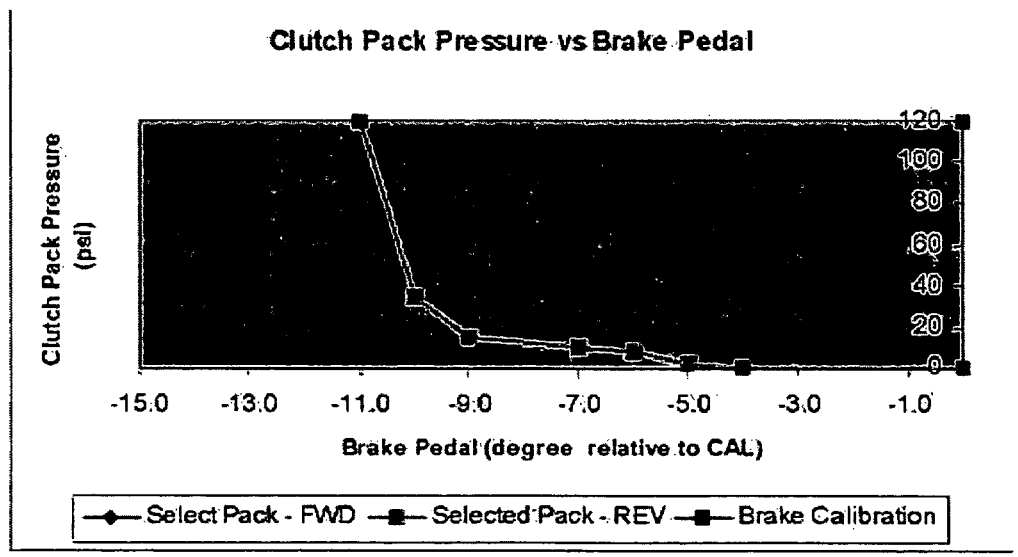
FIG. 13 is a graph depicting example inching pressure profile for a selected clutch pack.

In one embodiment, the anchor pressure is set to 100 PSI, at which point the brake shoe is in contact with the brake drum. Inching pressure vs. the position of the service inching/brake pedal 85 with respect to the anchor point is listed in FIG. 13. The anchor point may be set to 10 degrees, for example, as the default value.

To accommodate different working conditions and operator preferences, it is possible to allow technicians to adjust the inch/brake pressure overlap. Adjustment is achieved by shifting the inching pressure profile by an offset toward or away from the anchor point to increase or reduce the pressure overlap, respectively. The offset shifts the inching pressure profile based on the formula:

$$\text{offset degree} = (\text{offset value} - \text{zero offset}) \times \text{degree scale}$$

The variable "offset value" is an integer number, for example from 1 to 10, and is system programmable. The constants "zero offset" and "degree scale" are also programmable. In one embodiment, the starting point for the values are zero offset =3 and degree scale =0.5. These settings correspond to a minimum of −1.0 to a maximum of 3.5. The transmission 70 can be totally disengaged when the inching/brake pedal 85 is depressed passed a certain point, for example 70% of the stroke. The offset setting helps ensure the clutch pack pressure is totally reduced before the pedal reaches the 70% limit.

In the Inching sub-state 12, the transmission 70 is engaged in either the forward or reverse direction and the inching/brake pedal 85 is applied. The selected clutch pack is partially engaged to allow the vehicle to move more slowly while the engine 74 is running at high speed to support hydraulic operations. Inching allows the operator to drive the vehicle at a low speed or be stopped by partially or fully engaging the driving clutch pack and the service brake 91 simultaneously, while increasing the engine speed 87 to provide more hydraulic flow for hydraulic control. Inching is applied by pressing the inching/brake pedal 85. The inching/brake pedal 85 combines the inching and service brake functions. As the inching/brake pedal 85 is pressed, inching is progressively applied first and then braking is progressively applied. Inching control reduces the driving clutch pack pressure progressively as the inching/brake pedal 85 is pressed. Service brake pressure, which is controlled by the operator, is increased as the inching/brake pedal 85 is pressed down further. Service brake pressure does not rise during the initial inching/brake pedal movement. The more the inching/brake pedal 85 is pressed, the more the clutch pack pressure is reduced and the more the service brake pressure is increased. Reduced clutch pack pressure is called inching pressure.

When the operator depresses the inching/brake pedal 85, the VSM 30 proportionally reduces the selected clutch pack pressure based on the position of the inching/brake pedal 85 and/or brake pressure. The VSM 30 continuously maintains the inching/brake pressure overlap between clutch pack pressure and brake pressure using a combination of IBPP 85 and brake pressure feedback. The desired amount of inch/brake overlap is system programmable. If the selected clutch pack is empty, the VSM 30 quick fills the clutch pack to minimize control delay. At a given inching command with a constant load, the VSM 30 maintains a constant inching speed regardless of the change in engine speed 87, which can be achieved by centrifugal-pressure compensation.

Centrifugal-pressure compensation ensures consistent inching performance at various engine speeds 87. The transmitting torque of a clutch pack is proportional to the clutch pack pressure, and is also affected by the TISS 89. When a clutch pack is turning at high speed, the fluid inside is also spinning and asserts a radial pressure due to centrifugal force against the inside surface of the clutch cylinder. The radial pressure also applies an axial pressure against the piston, which compresses the clutch packs. The centrifugal pressure is additive to the controlled clutch pack pressure, and has the effect of increasing the transmitting torque. The additional torque varies with the engine speed 87. During conventional inching with a fixed IBPP 85, an operator may experience that the vehicle remains stationary at low engine speed but starts to move after the engine speed 87 is increased. For the same reason, a vehicle that has been inching slowly may come to stop after the engine speed 87 is reduced. Centrifugal pressure compensation eliminates the effect of centrifugal pressure, so that the control pressure maintains full control of the transmitting torque. Centrifugal pressure is a second order polynomial function of TISS 89. To simplify the calculation, centrifugal pressure can be approximated as a linear function as:

$$\text{centrifugal pressure} = (\text{TISS} - 900) \times \text{centrifugal pressure gain}.$$

If TISS 89 is less than 900 RPM, centrifugal pressure is set to zero. The theoretical value of centrifugal pressure gain is 405 PSI/RPM, which is a programmable value. Centrifugal pressure compensation is in effect only during inching. Inching is an open-loop function, but is under closed-loop control of the operator. Centrifugal pressure compensation may be deactivated if it is not effective during a control function.

If the operator presses the inching/brake pedal 85 while the transmission 70 is in the forward high gear, the IBPP 85 is less than approximately 2 degrees, and the vehicle travel speed is higher than or equal to approximately 7 MPH, the system transits to the Forward2 sub-state 19. If the IBPP 85 is less than 2 degrees and the vehicle travel speed is less than 7 MPH, the system transits to the Normal sub-state 11. If the IBPP 85 is less than 2 degrees and the APP 81 is less than 30%, the system transits to the Roll Reduction sub-state 17. If the vehicle travel speed is less than the downshift speed, for example 5 MPH, the system stays in the Inching sub-state 12, but drops the pressure of FWD2 clutch pack 72 and modulates the pressure of the FWD clutch pack 71 for inching control.

In the Quick Deceleration sub-state 22 shown in FIG. 4, a direction has been selected, a speed is commanded, and the vehicle travel speed is faster than the commanded speed by a predetermined amount or is moving at a high rate of speed in the opposite direction. The Quick Dump mode 24 allows the transmission 70 to be disabled when a fault is detected. In the Throttle Up sub-state 20, the demands for hydraulic control may require an engine speed 87 higher than the engine speed 87 required for speed control. The VSM 30 raises the engine speed 87 to provide sufficient pump flow, and keeps the vehicle travel speed as commanded. Throttle up automatically raises the engine speed 87 proportional to hydraulic flow rate requested when hydraulic functions are activated. The VSM 30 raises the engine speed 87 from its current level if the hydraulic flow demand is higher than current supply. Throttle-up speed control 20 is compatible with electro-hydraulics, pedal-based speed control 21, and an electronic throttle. Throttle-up speed control 20 works with pedal-based speed control 21 to maintain constant vehicle travel speeds with elevated engine speed 87. This enables the operator to predictably approach a load handling position at slow speed, with high engine rpm, and without pressing the inch/brake pedal 85. When throttle-up speed control 20 is active, the VSM 30 manages engine rpm and transmission slip to maintain vehicle travel speed while meeting hydraulic demand.

Pedal-based speed control 21 provides final vehicle travel speed directly proportional to the APP 81, similar to the function of a hydrostatic transmission. In order to provide pedal-based speed control 2, the VSM 30 can be designed with closed-loop speed control, instead of open-loop torque control. The braking or driving torque is proportional to operator's inputs. The pedal-based speed control 21 interprets the operator's inputs as desired vehicle travel speeds, not torque requests, and modulates the driving and/or braking torques to control the vehicle travel speed according to the APP. The VSM 30 maintains the vehicle travel speed proportional to the APP 81 by regulating the engine speed 87 and/or the transmission clutch pack pressures regardless of the loading condition. Similarly the VSM 30 maintains the vehicle travel speed proportional to the APP 81 when the engine speed 87 is raised to provide high flow for hydraulic control. The VSM 30 does not drive the drive-train against the service brake 91. If the operator applies the service brake 91, the VSM 30 reduces the speed command accordingly such that the VSM 30 does not drive the vehicle when substantial braking is applied. The VSM 30 controls vehicle acceleration and deceleration rates, in response to changes in APP 81, according to parameters which are system programmable.

The state transition diagram as shown in FIG. 4 provides a Bulldozing mode 23 which limits the output torque of the torque converter 75. The bulldozing function provides optimum horsepower to the transmission 70, and protects the drive axle from fatigue failure due to over-torque because of vehicle operating conditions such as bulldozing, acceleration, and vehicle travel on an uphill grade. If the torque-converter slip is too high, the engine speed 87 is reduced to limit the torque delivered. The bulldozing function also minimizes fuel consumption and heat buildup in the transmission 70. If the driving torque is higher than a threshold, the VSM 30 governs down the engine speed 87 to keep the driving torque below the threshold. The VSM 30 allows driving torque above the threshold for a short period of time before governing down the engine speed 87. This over-torque period offers a power burst at the beginning of the Torque Limiting mode 83. This provides enough torque to overcome extra resistance provided by a wheel in pot hole and still protect the transmission 70. The maximum allowable torque converter slip is programmable.

The Bulldozing mode 23 controls the torque converter slip to limit the heat generated and maximum driving torque generated by the torque converter 75. Torque converter slip is the speed difference between the engine speed 87 measured in engine revolutions per minute (ERPM) and the torque converter output shaft speed, which is also the TISS 89. While in the Bulldozing mode 23, the VSM 30 constantly monitors three input parameters: engine speed 87, TISS 89, and the APP. The VSM 30 actively governs the engine speed 87 if the following three conditions simultaneously exist: the vehicle travel speed is less than a bulldozing enable speed of approximately 3 MPH; the torque converter slip is e converter slip is higher than a bulldozing enable slip threshold level of approximately 1400 RMP; and the APP 81 is greater than a bulldozing enable acceleration threshold level associated with a APP 81 of approximately 60%. Before the VSM 30 sends out an engine overriding command, a time delay is imposed to give the vehicle an opportunity to overcome road obstacles. The Torque Limiting mode 83 is not engaged until the time delay of 1 second expires or torque converter slip is 200 rpm higher than allowable slip. Engine speed 87 is allowed to increase if the vehicle travel speed is faster than the bulldozing enable speed, the torque converter slip is less than the bulldozing enable slip, or the APP 81 commands acceleration less than the predefined value for bulldozing enable acceleration. There is an intentional hysteresis between the enabling and disabling of the Bulldozing mode 23. The hysteresis prevents the Bulldozing mode 23 from being activated and de-activated rapidly in sequence.

When the Bulldozing mode 23 is activated, the VSM 30 governs the engine speed 87 according to the vehicle travel speed; if the vehicle travel speed increases, the allowed engine speed 87 is increased as well. The implementation of governing the engine speed 87 depends on the engine type and governor or throttle control. With electronic governor control, the desired governed speed is set to the target speed regardless of the APP. Once Bulldozing mode 23 is deactivated, the desired governor speed is set to the maximum governed engine speed. Effectively, this releases the engine governor to limit the engine speed 87 normally with no override. With electronic throttle control, the engine speed 87 control is slightly different; the VSM 30 keeps the engine 74 to the desired speed, regardless of whether the APP 81 is increased or decreased. The engine governing override command stops if the APP 81 is reduced below the threshold bulldozing acceleration position.

The transmission system transition betweens all of these modes and sub-states according to the operator command and vehicle status. For example, and referring to FIG. 3, assume the system starts from the Neutral sub-state 14, which is the default sub-state in the Normal Operation mode 49. The system transits from the Neutral sub-state 14 to the Roll Reduction sub-state 17, and further to the Roll Back sub-state 16, Normal sub-state 11, Forward2 sub-state 19, Inching sub-state 12, Pack Braking sub-state 18, or Operator Interlock sub-state 15 based on the gear selection, engine throttle position 90, and the vehicle travel speed and direction. The selected direction can either be forward or reverse in each sub-state, except the Forward2 sub-state 19 which is by definition in forward. The operator can change direction at any time. While in the Normal sub-state 11, and if the operator becomes absent for more than 1.5 seconds, the system transits to the Operator Interlock sub-state 15. From the Operator Interlock sub-state 15, the system transits to the Neutral sub-state 14 only if the operator presence is detected and either the vehicle is placed in neutral, if the FNR level 94 is installed, or alternatively that the operator releases the FDC pedal 91, if installed.

From the Neutral sub-state 14, the system transits out of neutral if the operator is present and a direction is selected. If the APP 81 is less than approximately 30% when a direction is selected, the system transits to the Roll Reduction sub-state 17. If the APP 81 is more than 30% and the IBPP 85 is more than 3 degrees, the system transits to the Inching sub-state 12. Otherwise, the system transits to the Normal sub-state 11.

If the system transits from the Neutral sub-state 14 to the Normal sub-state 11, the selected clutch pack is filled before pressure modulation. The modulation profile includes over-pressure quick filling for approximately 250 ms at the beginning of modulation. When the clutch pack slip is higher than a threshold, for example 1200 RPM, before the selected clutch pack is engaged, the engine speed 87 is governed down to the idle speed momentarily to allow the clutch pack to be engaged with minimum clutch pack slip. The engine speed 87 is resumed after the clutch pack is engaged. This control strategy is practically applied for both selected and opposite clutch pack engagements and the engagement phase of a power reversal. After the selected clutch pack is filled, the selected clutch pack pressure is modulated up. The engine speed 87 is resumed at a rate of approximately 1000 RPM/second. During the modulation process, if the clutch pack slip exceeds more than a threshold of approximately 200 RPM, the engine speed 87 is held constant while the clutch pack pressure modulation continues. The engine speed 87 is increased again if the clutch pack slip is less than a threshold of 50 RPM. With an electronic governor control, the desired engine speed 84 is resumed all the way to the governor speed. When the desired engine speed 84 is higher than the actual engine speed 87 set by the accelerator 81, the engine speed 87 does not increase. With electronic throttle control, the desired speed is increased up to a target speed set by the accelerator 81. The engine speed 87 resumption stops when the engine speed 87 reaches a programmable target speed. An alternative to governing down the engine speed 87 is to reduce the engine output torque.

From the Normal sub-state 11, if the APP 81 is less than approximately 15% and the vehicle travel speed slower than approximately 3 MPH, the system transits to the Roll Reduction sub-state 17. If the APP 81 is less than 15% and the vehicle travel speed is higher than 3 MPH, the system transits to the Pack Braking sub-state 18. If the vehicle is moving faster than 3 MPH in the opposite direction from the selected direction, the system also transits to the Pack Braking sub-state 18. If the inching/brake pedal 85 angle is more than 3 degrees, the system transits to the Inching sub-state 12. The VSM 30 up-shifts to the Forward2 sub-state 19 if the vehicle travel speed is higher than the up-shift speed of approximately 7 MPH, the selected direction is forward, and the forward high gear is installed on the vehicle.

Figure 11:
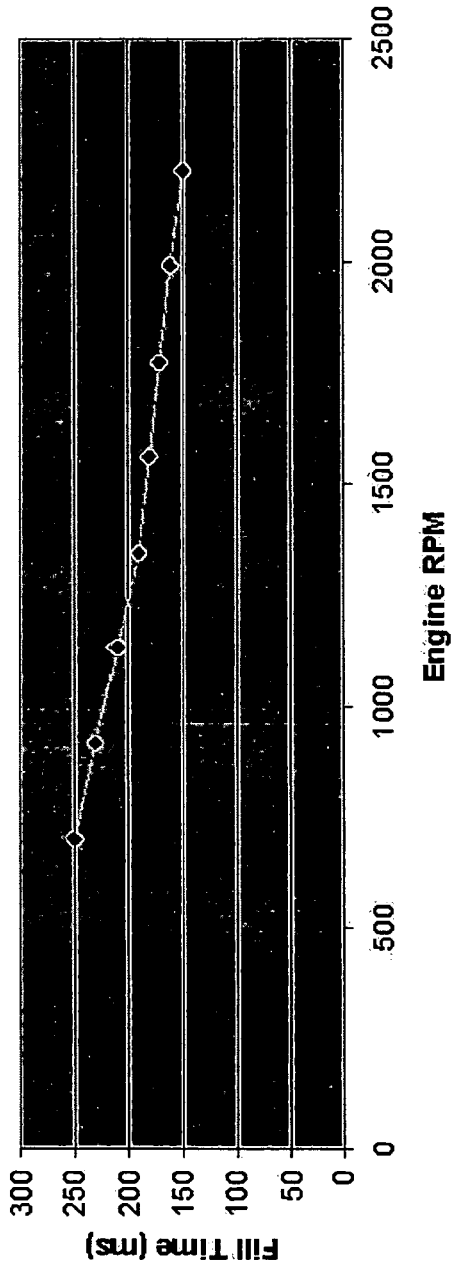
FIG. 11 is a graph depicting example filling time of a clutch pack versus engine speed.

When the system transitions from the Neutral sub-state 14 to the Roll Reduction sub-state 17, both the FWD clutch pack 71 and REV clutch pack 73 are filled before being pressurized. The VSM 30 fills both clutch packs with a high pressure of approximately 60 PSI until the TISS 89 drops 10% from the initial level, the clutch pack pressure is 2 PSI higher than the designed filling pressure, or the filling time has ended. The filling time is a function of the engine speed 87, as shown in FIG. 11. The pump pressure available is low when the engine speed 87 is low. Thus, a longer filling time is typical at low engine speeds. Once both clutch packs are filled, the VSM 30 increases both clutch pack pressures as a function of time. After the modulation is ended, the two clutch pack pressures are held at the final modulation pressure. Filling time, filling pressure, and modulation pressure profiles may be adjusted for different vehicle weights and load capacities.

When the system transits from the Normal sub-state 11 to the Roll Reduction sub-state 17, the selected clutch pack is already at full pressure, while the opposite clutch pack is empty, or at zero pressure. The VSM 30 fills and pressurizes the opposite clutch pack to a partial pressure, while keeping the selected clutch pack pressure high. When the system transits from the Pack Braking sub-state 18 to the Roll Reduction sub-state 17, both clutch packs are partially pressurized. The VSM 30 increases the selected clutch pack pressure to the full pressure, while reducing the opposite clutch pack pressure. The two clutch pack pressures are increased or decreased as functions of time. If the initial clutch pack pressure is already above a threshold pressure, the VSM 30 increases the clutch pack pressure from its current level, instead of from the threshold pressure.

From the Roll Reduction sub-state 17, if the APP 81 is less than approximately 2%, the system transits to the Roll Back sub-state 16. If the APP 81 is more than approximately 30%, the system transits to the Normal sub-state 11. If the vehicle is moving faster than approximately 3 MPH in either direction and the APP 81 is less than 30%, the system transits to the Pack Braking sub-state 18. If the selected direction is changed, the system stays in the Roll Reduction sub-state 17, but exchanges pressure modulation profiles for the selected and opposite clutch packs. From the Roll Back sub-state 16, if the APP 81 is more than approximately 5%, or the vehicle travel speed is greater than approximately 3 MPH, the system transits to the Roll Reduction sub-state 17. If the selected direction is changed, the system stays in the Roll Back sub-state 16 but exchanges pressure modulation profiles for the selected and opposite clutch packs.

If the system transits from the Limited Rolling sub-state 13 to the Normal sub-state 11, as shown in FIG. 2, the selected clutch pack is already filled and at a high pressure. The opposite clutch pack is also filled and is at a low pressure. The VSM 30 gradually ramps down the opposite clutch pack pressure to ensure a smooth transition. The ramp down rate is programmable.

The system can transit into the Normal (forward) sub-state 11 from the Roll Reduction sub-state 17, Pack Braking sub-state 18, and the Forward2 sub-state 19. No matter what the previous state was, the VSM 30 modulates the FWD clutch pack 71 to the full pressure, while keeping the REV clutch pack 73 pressure low when transiting to the Normal (forward) sub-state 11. If the system is transitioning from the Roll Reduction sub-state 17, the VSM 30 maintains the final pressure of the REV clutch pack 73 for approximately 3 seconds, until the engine speed 87 is higher than approximately 1200 RPM or until the vehicle travel speed is faster than approximately 3 MPH, whichever comes first. The FWD clutch pack pressure is modulated up to the full pressure as a function of time, as shown in FIG. 18. If the initial FWD clutch pack pressure is higher than the entry pressure level, the pressure modulation starts from the initial level, instead of the entry level. That is, the FWD clutch pack pressure is not reduced during the modulation.

Figure 7:
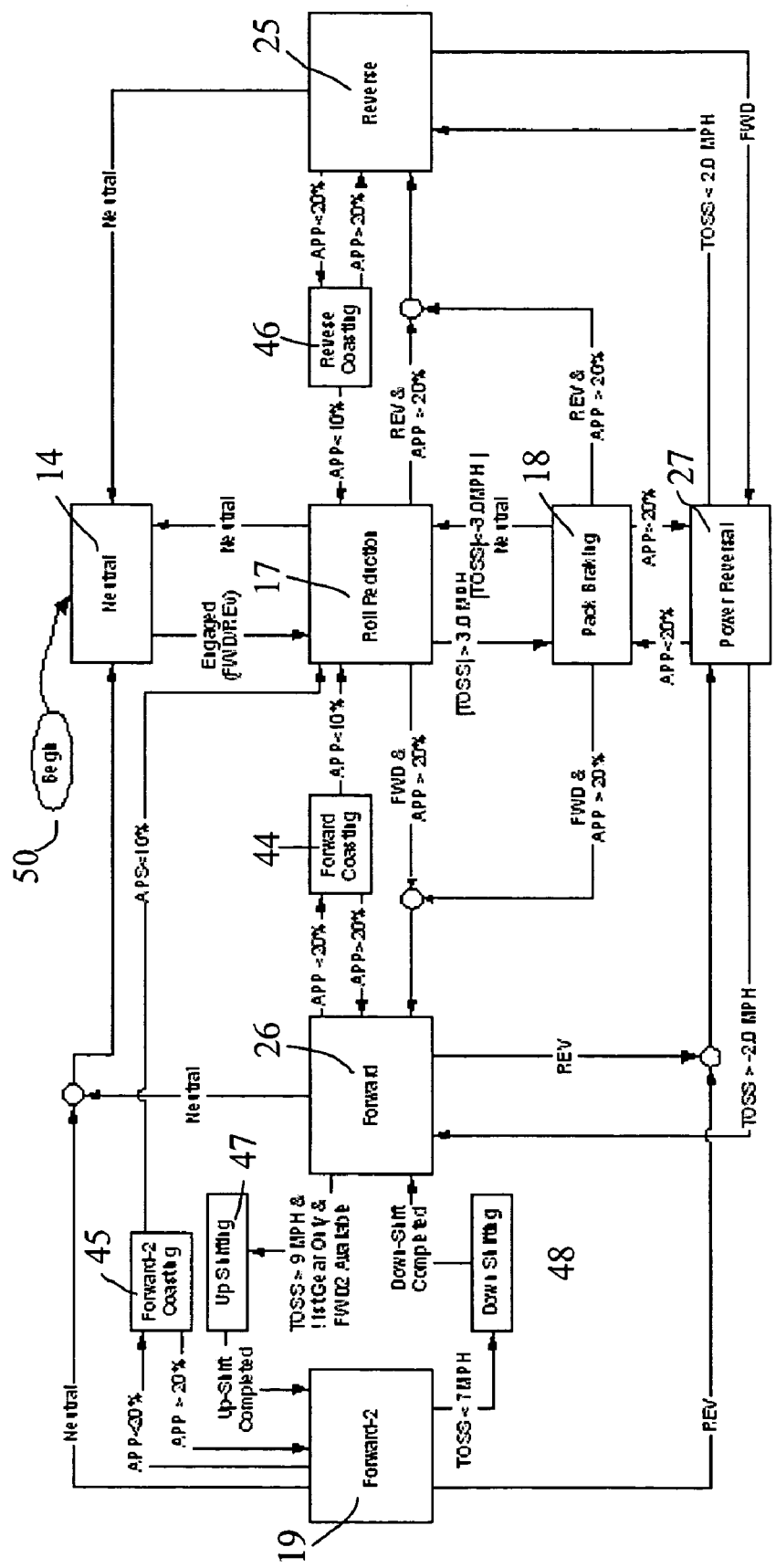
FIG. 7 is a state transition diagram of a fourth embodiment of the normal operation state, including a forward and reverse coasting sub-state.

As shown in FIG. 7, the system can transit from a Forward sub-state 26 or a Reverse sub-state 25 to a Forward Coasting sub-state 44 or a Reverse Coasting sub-state 46, respectively, if the APP 81 is between approximately 10% and 20%, or the vehicle is placed in neutral. The Forward and Reverse sub-states 26 and 25 are part of the Normal sub-state 11, but with the vehicle direction specified. The Coasting sub-states 44 and 46 allow the selected clutch pack to stay engaged while the engine 74 is at low idle, in which case the vehicle slows down due to engine drag. The Coasting sub-states 44 and 46 keeps the selected clutch pack pressure high. If the APP 81 is increased beyond 20%, the system transits back to the Forward sub-state 26 or the Reverse sub-state 25. If the APP 81 is reduced below 10%, the system transits to the Roll Reduction sub-state 17. From there it may further transit to the Pack Braking sub-state 18, depending on the vehicle travel speed. For two-speed transmissions, if the FWD2 clutch pack 72 is engaged, the VSM 30 down-shifts from the FWD2 clutch pack 72 to the FWD clutch pack 71 in order to reduce the vehicle travel speed before transiting to the Pack Braking sub-state 18. Coasting is not considered a separate sub-state, but is considered part of the Forward sub-state 26 or Reverse sub-state 25 if the APP 81 is between approximately 20% and 30%.

From the Forward2 sub-state 19, if the vehicle travel speed is less than the downshift speed, for example 5 MPH, the VSM 30 downshifts the transmission 70 to the Normal sub-state 11. If the IBPP 85 is more than approximately 3 degrees, the system transits to the Inching sub-state 12. The system transits to the Pack Braking sub-state 18 if the reverse direction is selected, or the APP 81 is less than approximately 30% and the vehicle travel speed is higher than approximately 9 MPH. If the APP 81 is between 15% and 30%, then the system transits to the Forward2 Coasting sub-state 45. If the APP 81 is less than 15%, then the system transits to the Pack Braking sub-state 18.

When a power reversal occurs, the system first transits to the Pack Braking sub-state 18 to reduce the vehicle travel speed, followed by the engagement of the selected gear. The sub-state transition that occurs during normal operation is determined based on the direction selected, vehicle travel speed, IBPP 85, and APP 81, as shown in FIG. 8. The vehicle travel speed, which is calculated based on the TOSS 88, is considered low when the vehicle travel speed is less than approximately 3 MPH; otherwise, the vehicle travel speed is considered high. The IBPP 85 is considered high when pressed down more than approximately 5%; otherwise, the IBPP 85 is considered low. The APP 81 is considered high when pressed down more than 20%; otherwise, the APP 81 is considered low.

A Vehicle travel speed Limiting mode 67, when enabled, limits the vehicle travel speed below a programmable maximum speed. Traction speed may be limited to a set speed of 6 MPH, for example. The ability of the VSM 30 to control vehicle travel speed in this mode is determined by the maximum engine compression braking, and without the use of clutch pack braking. This function is particularly effective on flat ground and going up hill. While it is also possible to control maximum vehicle travel speed by slipping the clutch packs it would generate excess heat and reduce fuel economy, and is thus not included as one embodiment. If the vehicle is traveling at the maximum speed, and the operator requires higher hydraulic flow, the inching/brake pedal 85 may be pressed, which disables the Vehicle travel speed Limiting mode 67.

To ensure smooth engagements without risk of overheating the selected clutch pack, multiple modulation profiles are defined for the selected clutch pack. The selection of modulation profile is based on the engine speed 87. If the engine speed 87 is less than approximately 1000 RPM, a low-speed modulation profile is selected. If the engine speed 87 is between approximately 1000 and 1800 RPM, a medium-speed modulation profile is selected. If the engine speed 87 is above 1800 RPM, a high-speed modulation profile is selected. The VSM 30 is able to change from one profile to another based on the current engine speed 87, and more or less profiles may be utilized. If the engine speed 87 changes from one range to another for any reason, such as the operator changing the APP 81 or because of engine drag, the modulation profile of the new engine speed range is applied. The three modulation profiles of the selected clutch pack have the same time stamp. As the operator increases the engine speed 87, the operator expects a more aggressive engagement of the selected clutch pack. If the engine speed 87 drops, the operator will expect a smoother engagement. An electronic governor control actively limits engine speed 87. Engine speed 87 is reduced during transitions, even if the operator maintains an unnecessarily high engine throttle position 90. After a transition event, the engine speed 87 is returned to the level being commanded by the operator. This strategy reduces shock loads to the transmission 70. In one embodiment, the pressures of the FWD clutch pack 71, REV clutch pack 73, and the FWD2 clutch pack 73 are directly and individually modulated through pressure-reduction solenoid valves electronically controlled by the VSM 30. The VSM 30 controls the electrical current through these solenoid valves to modulate the pressure of each clutch pack. The clutch pack pressure is proportional to the current.

A smooth engagement of the selected clutch pack at low engine speed reduces the risk of engine stall during power reversal. During power reversal, the vehicle is running in the opposite direction at the beginning of engagement. At a low engine speed, the engine 74 does not have much low-idle torque. If the selected clutch pack is engaged aggressively, the torque-converter output shaft attempts to turn in the opposite direction of engine rotation, which can load the engine 74 so much that the engine 74 stalls. If the operator feels the power reversal is taking too long, the operator may either apply the service brake 91 to slow down the vehicle or increase the engine speed 87 to engage the selected clutch pack more aggressively. The pre-filling of requested clutch packs is desirable whenever the clutches are not full. The clutch design includes a volume of clutch space to be filled before the clutch disk is able to deliver torque. The filling time is a function of the engine speed 87, as shown in FIG. 11, and the volume of clutch space to be pre-filled. The pump pressure availability is low when the engine speed 87 is low, such that a longer filling time is typical at low engine speeds.

Figure 5:
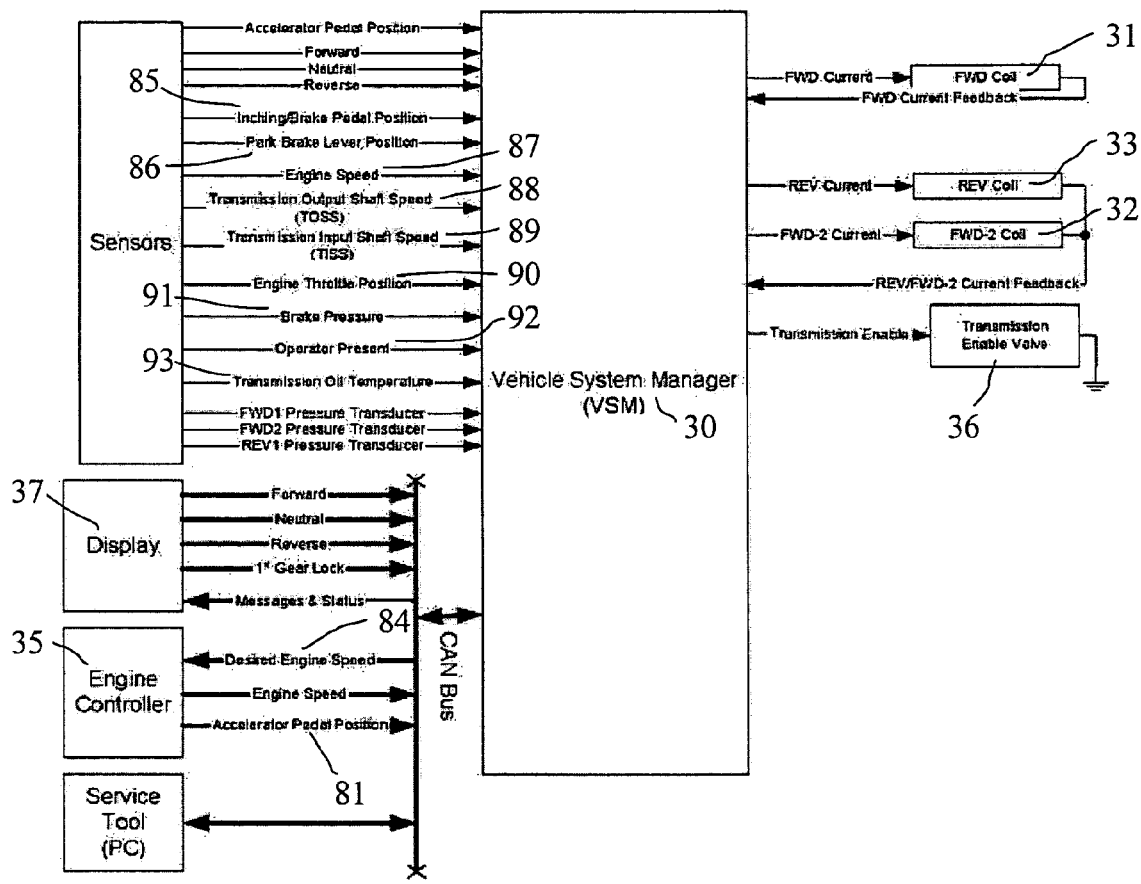
FIG. 5 is a block diagram showing a first embodiment of the transmission system control components.
Figure 6:
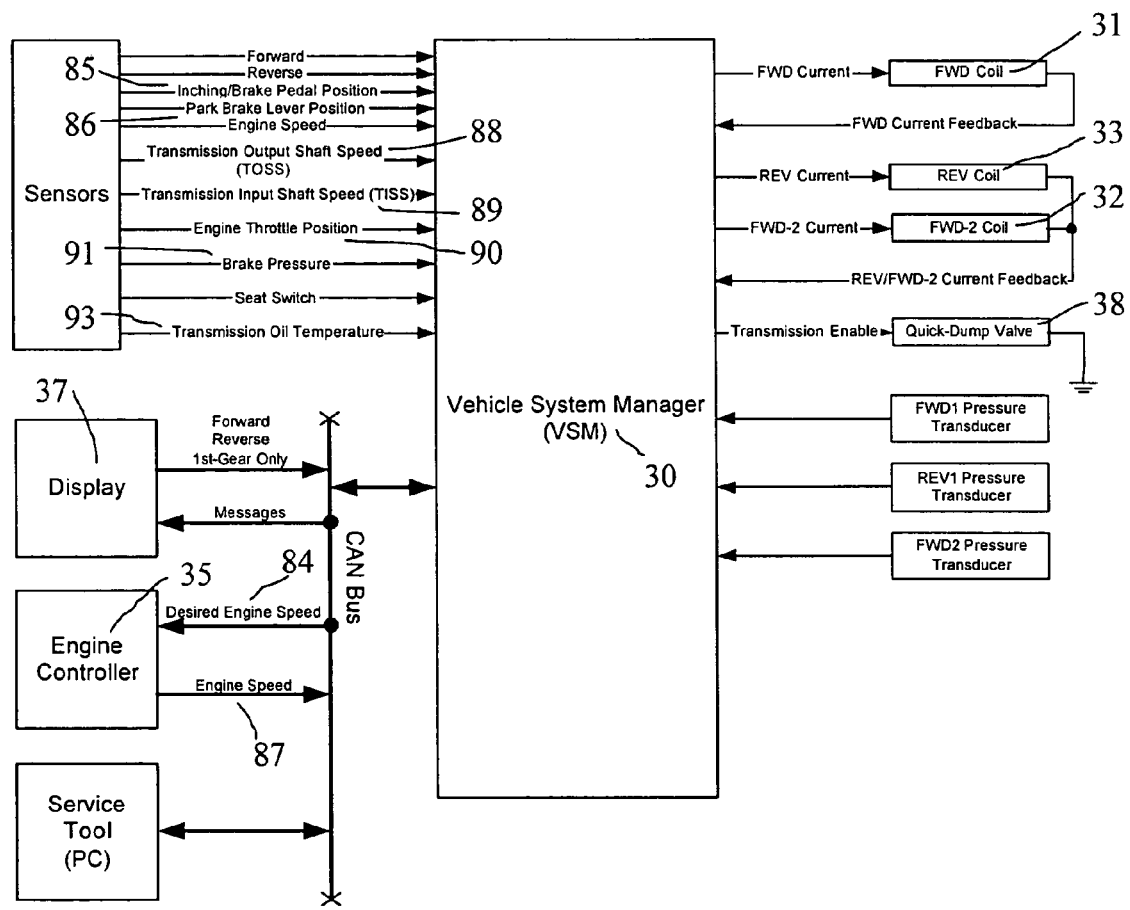
FIG. 6 is a block diagram showing a second embodiment of the transmission system control components.

The components of the transmission control system are shown in alternate embodiments as depicted in FIG. 5 and FIG. 6. The VSM 30 executes the transmission control, in addition to many other tasks. For transmission control, the VSM 30 receives inputs related to transmission control and sends electrical currents to the coils of the pressure-reduction valves to control clutch pack pressures.

The transmission control system uses open-loop pressure control. Once a desired pressure is assigned for a clutch pack, the VSM 30 may use a table lookup to determine the corresponding current and apply closed-loop current-feedback control to ensure the current meets the command. In one embodiment, pressure feedback is used for diagnostics and countermeasures, but not for closed loop pressure control. The VSM 30 drives the coil current in PWM (Pulse Width Modulation) form. The current is roughly proportional to the duty cycle percentage, though not necessary linearly. The current control consists of two parts: feed-forward and feedback. The feed-forward term is a proportional gain, and is determined as the ratio between duty cycle and current. The ratio is not constant and is affected by coil temperature 93 and battery voltage. The feed-forward gain is an average of the ratio. The feedback terms makes up the difference between the actual and average ratios. The PID gains of the current control are system programmable. The VSM 30 implements the feed-forward term in addition to the feedback P/R) according to the table lookup of the desired current. The tuning of the feed-forward and feedback gains starts with the feed-forward gain with all PID gains set to zero. The feed-forward gain, which is an open-loop gain, is set to a value that has the open-loop current control error as small as possible. Then, the proportional gain is tuned to reduce the closed-loop current control error, and the differential gain is tuned to reduce oscillation. Last, the integral gain is tuned to eliminate the steady-state error.

A PI (Proportional, Integral) feedback control loop is implemented to control the current following the pressure command. The output pressure of the pressure-reduction valve is a fixed function of the coil current. To control a clutch pack pressure, the VSM 30 references a lookup table to determine the corresponding coil current. Then, the VSM 30 uses a PI feedback control to ensure the coil current meets the target. That is, the pressure control is open loop, but the current control is closed loop. The PI gains of the current control are system programmable.

The up-shifting capability for a two-speed transmission automatically shifts the transmission from first to second gear smoothly. The VSM 30 automatically shifts the transmission 70 from first to second gear when the vehicle travel speed is above the up-shift threshold. The VSM 30 then controls the pressures of both the FWD clutch pack 71 and the FWD2 clutch pack 72 with proper pressure overlap to ensure smooth up-shift. If the transmission 70 is under a heavy load, the VSM 30 provides a slight delay of the disengagement of the FWD clutch pack 71, so the vehicle travel speed does not slow down. The vehicle travel speed at the up-shift threshold and the pressure modulation profile of both the FWD clutch pack 71 and the FWD2 clutch pack 72 are programmable. Up-shifting becomes active if the high gear is allowed (i.e. first gear is not locked), the vehicle travel speed is at high speed, the forward direction is selected, and the FWD2 clutch pack 72 is installed. The up-shift speed is typically a fixed speed, for example 7 MPH. The actual up-shift speed of each vehicle capacity is to be determined based on the gear ratio and engine, and is system programmable. To ensure a smooth up-shift, the FWD2 clutch pack 72 is filled and modulated up to a threshold before the FWD clutch pack 71 is drained.

A downshift transition occurs when the vehicle travel speed is less than a predefined downshift speed. A first-gear-lock option does not force an immediate down-shift. If the operator selects the first-gear-lock option while the vehicle is in high gear, the system stays at high gear and waits for normal down-shift. A first-gear-lock indicator light can be programmed to flash during the time that the vehicle is in high gear and the first-gear-lock indicator has been selected. The downshift speed is typically set at a fixed speed, for example 5 MPH. The actual downshift speed of each vehicle capacity is to be determined based on the gear ratio and engine, and is system programmable. To ensure a smooth downshift, the FWD clutch pack 71 is filled and modulated up to a threshold before the FWD2 clutch pack 72 is drained. There is a pressure overlap between both clutch packs. The two modulation profiles are tuned to give minimum disturbance of vehicle travel speed during up-shift. Due to the gear ratio difference between the first and second gears, the engine speed 87 increases momentarily when the transmission 70 downshifts. The engine acceleration causes engine braking, which can create undesired braking abruptness. The higher the speed when downshift occurs, the greater the degree of abruptness. One way to minimize this abruptness is to increase the modulation time of the FWD clutch pack 71 to an acceptable level without creating too much clutch pack heat. Another way is to select a lower downshift speed.

During clutch pack braking and power reversals, vehicle kinetic energy is absorbed by the clutch packs and is rejected from the transmission oil via a cooling system (e.g. radiator). Vehicles have limited cooling capacity. Once the temperatures of the clutch packs or the transmission oil reach threshold limits, it is desirable to manage thermal load of clutch pack braking to minimize the likelihood of mechanical failure. Transmission Thermal Management 66 can be divided into clutch pack thermal management, and transmission oil temperature 93 management.

If the vehicle is traveling down a long grade and the transmission 70 is in clutch pack braking for an extended period of time, then the maximum heat that the clutch packs absorb may be limited by clutch pack thermal management. The VSM 30 calculates and keeps track of the energy absorbed over time when the transmission 70 is clutch pack braking according to the following equation:

$$\text{energy} = \text{integrate}\ [(\text{clutch pack pressure} \times |\text{clutch pack slip}|) - K\ (\text{ref temp} - \text{sump temp}) \times \text{ERPM}]$$

Reference temp=200F
Sump temp=transmission oil temperature
K=heat-rejection coefficient
ERPM=engine rpm
$|\text{clutch pack slip}| = |\text{TISS} - \text{TOSS}| \times \text{Gear}_{Ratio}$ It is desirable that the energy absorbed be reduced when heating exceeds cooling capabilities. The remedial action when the energy absorption limit is reached for a predetermined period of time (measured in seconds) is to reduce the amount of clutch pack braking and to reduce the maximum available engine speed 87 to approximately 50% capability. Additional actions may be taken, such as to warn the operator by sounding an audible alarm, turn on the transmission oil temperature indicator lamp, and display a message such as "Speed Restricted." The transmission control system may be returned to the Normal sub-state 11 when the energy absorbed is reduced to a level below the reset thermal limit of the transmission control system. The reset thermal limit is below the energy absorption limit to provide this function with some hysteresis, so that the system does not oscillate in and out of the Normal sub-state 11. The coefficients and limits for this function are system programmable.

Similarly, there is a limit to the transmission oil temperature 93 that is desirable not to exceed. The VSM 30 may respond to high transmission oil temperature 93 by providing an operator warning and in some cases by implementing a transmission speed limitation. The VSM 30 monitors transmission oil temperature 93, and if the transmission oil temperature 93 exceeds the transmission temperature limit, then the operator is warned. The operator warning may include sounding an audible alarm for 10 seconds, for example, and turning on a transmission oil temperature indicator lamp. If the operator continues to operate the vehicle long enough and hard enough, damage to the transmission 70 may result. The operator warning is turned off when the transmission oil temperature 93 is below the temperature limit.

The VSM 30 can be programmed to de-rate the transmission speed and thereby limit the vehicle travel speed. The VSM 30 can allow vehicle operations to continue with limited vehicle travel speed. Alternatively, the VSM 30 can allow normal operations to last for 30 second before engine shutdown. After the engine 74 is shut down, the system transits from the Normal Operation state 3 to the Neutral Interlock state 2.

The formulas, variables, and values described above are shown as examples of one embodiment, however it is within the spirit of this invention that such formulas, variables, and values can vary to provide different functionality or as necessitated by different applications of the invention. Formulas, variables, and values are system programmable.

The system and apparatus described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for controlling a power-shift transmission comprising:
controlling a vehicle travel speed by simultaneously slipping two or more clutch packs associated with opposing directions or a same direction of vehicle travel and adjusting an engine speed, according to a programmed response associated with a change in one or more of a desired engine speed, transmission input shaft speed, a selected direction of vehicle travel, and an accelerator position.

2. The method according to claim 1 including applying balanced pressures to the two or more clutch packs such that the vehicle travel speed is limited to a predefined maximum speed greater than zero miles per hour when the accelerator position is fully released.

3. The method according to claim 2 wherein the vehicle travel speed is held to zero miles per hour on level ground or gradual incline and the vehicle travel speed is limited to a low travel speed on an increased incline.

4. The method according to claim 1 including temporarily reducing an amount of torque converter slip allowed and the vehicle travel speed permitted by limiting the engine speed when a transmission fluid temperature exceeds a predefined threshold value.

5. The method according to claim 1 including applying predefined levels of pressure to the two or more clutch packs such that an equal amount of energy is absorbed by each of the two or more clutch packs.

6. A method for controlling a power-shift transmission comprising:
decreasing an engine speed and controlling a vehicle operating temperature when:
a torque converter slip exceeds a predefined bulldozing enable slip;
a vehicle travel speed is less than a predefined bulldozing enable speed; and
an operator requested vehicle acceleration exceeds a predefined bulldozing acceleration.

7. The method according to claim 6 wherein the engine speed is decreased after a short time delay to allow for a temporary increased level of torque.

8. The method according to claim 7 including canceling the time delay when the torque converter slip exceeds a threshold slip level higher than the predefined bulldozing enable slip.

9. The method according to claim 6 including increasing the engine speed when:
the vehicle travel speed exceeds a predefined threshold level that is greater than a bulldozing exit speed;
the torque converter slip is less than the bulldozing exit speed; or
the operator requested vehicle acceleration is less than a bulldozing acceleration exit limit.

10. The method according to claim 1 including maintaining a constant rate of vehicle travel speed independent of load by adjusting the engine speed and pressure provided to one or more of the clutch packs as a function of the accelerator position.

11. The method according to claim 10 including adjusting the engine speed and pressure provided to the one or more clutch packs to deliver a requested vehicle hydraulic system flow while maintaining a requested vehicle travel speed.

12. A method for controlling a power-shift transmission comprising:
disengaging one or more clutch packs when a vehicle parking brake is applied;
remembering a last selected vehicle direction of travel; and
automatically re-engaging the one or more clutch packs according to the last selected vehicle direction of travel when the vehicle parking brake is released.

13. A system for controlling a power-shift transmission and an internal combustion engine of a vehicle comprising:
one or more reverse clutch packs associated with a reverse direction of vehicle travel;
one or more forward clutch packs associated with a forward direction of vehicle travel; and
a vehicle system manager which is used to control an engine speed and a vehicle travel speed while controlling an amount of pressure supplied to the reverse and forward clutch packs in a simultaneous state of slipping.

14. The system according to claim 13 including:
a foot direction controller for selecting the forward or reverse direction of vehicle travel, wherein the vehicle system manager places the transmission in a neutral state when all clutch packs are disengaged and a parking brake is applied, and wherein the vehicle system manager then re-engages the clutch packs after the parking brake is released in a last selected direction of travel determined by the foot direction controller prior to the parking brake being engaged.

15. The system according to claim 13 wherein a minimum rollback pressure supplied to the reverse and forward clutch packs is modulated such that a maximum allowable vehicle travel speed can be set to zero for a predefined slope and can be set to a non-zero value for a slope having an angle greater than the predefined slope when an accelerator is fully released.

16. The system according to claim 13 wherein the vehicle system manager limits the engine speed when a transmission fluid temperature exceeds some predefined threshold level.

17. The system according to claim 13 wherein the vehicle system manager maintains hydraulic fluid flow requirements of an hydraulic system by controlling the engine speed, and maintains the vehicle travel speed proportional to an accelerator position by controlling the amount of pressure supplied to one or more of the reverse and forward clutch packs.

18. The system according to claim 13 including a torque converter that applies a braking torque to the engine during a braking condition, wherein the vehicle system manager modulates the pressure provided to the clutch packs to maintain a torque converter output speed at a low speed to prevent stalling of the engine.

19. The system according to claim 13 wherein the vehicle manager system modulates clutch pack pressures provided to the forward and reverse clutch packs as a function of accelerator position to avoid abrupt changes in the vehicle travel speed when the vehicle is moving slowly in a controlled roll reduction state.

20. The system according to claim 13 including an engine controller which controls the engine speed and is responsive to commands sent by the vehicle system manager.

21. The system according to claim 13 including a torque converter to generate a driving torque, wherein the vehicle system manager governs the engine speed to a lower speed when:
the vehicle travel speed is less than a bulldozing enable speed threshold value; and
a torque converter slip of the torque converter is more than a bulldozing enable slip threshold value.

22. The system according to claim 21 wherein the vehicle system manager allows a temporary continuation of the driving torque during a timed delay or until the torque converter slip exceeds a predefined threshold slip value which is greater than the bulldozing enable slip threshold value.

23. A method for controlling a transmission system comprising:
- modulating pressure provided to a clutch pack associated with a selected direction of vehicle travel proportional to an inching/brake mechanism position;
- gradually increasing brake pressure when the inching/brake mechanism position is in an approximately first half of a range of motion;
- measuring the brake pressure associated with the inching/brake mechanism position;
- identifying an anchor point where the brake pressure reaches a specified target pressure; and
- automatically adjusting a relationship between the inching/brake mechanism position and the pressure provided to the clutch pack according to the anchor point to maintain a preset relationship between a transmission torque and a brake torque.

24. The method according to claim 23 including adjusting a preset pressure provided to the clutch pack in relation to the brake torque according to the inching/brake mechanism position.

25. The method according to claim 23 including compensating for an effect of centrifugal pressure acting on an inside of a clutch cylinder to maintain a constant vehicle inching speed regardless of a change in engine speed.

26. The method according to claim 25 including compensating for the centrifugal pressure by offsetting an equivalent amount of clutch pack pressure associated with the centrifugal force.

27. A control system for a vehicle, comprising a processor configured to:
- simultaneously slip two or more clutch packs associated with opposing directions or a same direction of vehicle travel;
- monitor when an energy absorption limit is reached; and
- automatically limit an energy absorbed by the two or more clutch packs below the energy absorption limit 28. The control system according to claim 27 wherein the processor is further configured to reduce pressure to the two or more clutch packs when the energy absorption limit is reached.

29. The control system according to claim 27 wherein the processor is further configured to govern an engine speed to a lower speed when a vehicle travel speed drops below a predetermined value and a torque convert slip is more than a threshold value.

30. The control system according to claim 27 wherein the processor is further configured to determine that the energy absorption limit is reached when a torque converter slip is above a predefined value.

31. The method according to claim 23 including gradually decreasing a vehicle travel speed requested by an accelerator position in proportion to the inching/brake mechanism position being adjusted in a downward direction.

32. The method according to claim 31 including rapidly increasing the brake pressure and rapidly reducing a pressure provided to one or more clutch packs, when the inching/brake mechanism position is in an approximate last half of the range of motion.

33. The method according to claim 23 including gradually increasing the pressure provided to the clutch pack in proportion to the inching/brake mechanism position being adjusted in an upward direction.

34. The method according to claim 1 including:
- identifying when an energy absorption limit is reached, wherein the two or more clutch packs are associated with the opposing directions of vehicle travel; and
- limiting energy absorbed by the two or more clutch packs below the energy absorption limit.

35. The method according to claim 34 wherein the energy absorption limit is identified as being reached when a torque converter slip is above a predefined value, and wherein the method includes reducing pressure to the two or more clutch packs when the energy absorption limit is reached.

* * * * *

UNITED STATES PATENT AND TRADEMARK OFFICE
CERTIFICATE OF CORRECTION

PATENT NO. : 7,974,760 B2  Page 1 of 1
APPLICATION NO. : 11/516913
DATED : July 5, 2011
INVENTOR(S) : John Rowley et al.

It is certified that error appears in the above-identified patent and that said Letters Patent is hereby corrected as shown below:

Title page, item [60] should read:

-- Continuation of PCT/US2005/021956, filed on Jun. 20, 2005. --

Signed and Sealed this
Twenty-fifth Day of December, 2012

David J. Kappos
*Director of the United States Patent and Trademark Office*

UNITED STATES PATENT AND TRADEMARK OFFICE
CERTIFICATE OF CORRECTION

PATENT NO. : 7,974,760 B2  
APPLICATION NO. : 11/516913  
DATED : July 5, 2011  
INVENTOR(S) : John Rowley et al.

Page 1 of 1

It is certified that error appears in the above-identified patent and that said Letters Patent is hereby corrected as shown below:

Title page, item [60] should be deleted.

Title page, item [63] should read:

-- Continuation of PCT/US2005/021956, filed on Jun. 20, 2005, which is a continuation-in-part of Application No. 10/689,812, filed on Oct. 20, 2003, now Pat. No. 6,950,737. --.

Signed and Sealed this  
Twenty-fifth Day of November, 2014

Michelle K. Lee  
*Deputy Director of the United States Patent and Trademark Office*